US006822771B2

(12) United States Patent
Funato et al.

(10) Patent No.: US 6,822,771 B2
(45) Date of Patent: Nov. 23, 2004

(54) OPTICAL PICKUP UNIT AND OPTICAL DISK DRIVE FOR ACCURATE AND STABLE INFORMATION RECORDING AND REPRODUCTION

(75) Inventors: Hiroyoshi Funato, Kanagawa (JP); Shigeru Oohchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 10/254,635

(22) Filed: Sep. 26, 2002

(65) Prior Publication Data

US 2003/0072047 A1 Apr. 17, 2003

(30) Foreign Application Priority Data

Sep. 28, 2001 (JP) ........................................ 2001-300051
Mar. 14, 2002 (JP) ........................................ 2002-070186

(51) Int. Cl.[7] ................................................ G02B 5/32
(52) U.S. Cl. .................... 359/15; 369/103; 369/112.04; 369/112.07
(58) Field of Search ........................... 359/15; 369/103, 369/112.1, 112.15, 112.04, 112.12, 112.03, 112.07

(56) References Cited

U.S. PATENT DOCUMENTS

| | | |
|---|---|---|
| 5,031,978 A | 7/1991 | Shibaguchi et al. |
| 5,175,642 A | 12/1992 | Funato |
| 5,208,800 A | 5/1993 | Isobe et al. |
| 5,231,620 A | 7/1993 | Ohuchida |
| 5,325,348 A | 6/1994 | Maeda et al. |
| 5,333,231 A | 7/1994 | Fukuda et al. |
| 5,402,154 A | 3/1995 | Shibaguchi et al. |
| 5,428,588 A | 6/1995 | Ohuchida |

(List continued on next page.)

FOREIGN PATENT DOCUMENTS

| | | |
|---|---|---|
| JP | 2000-076689 | 3/2000 |
| JP | 2001-216677 | 8/2001 |

OTHER PUBLICATIONS

"Retardation Film" by Yasunori Taga, vol. 46, No. 7, 1995, pp. 32–35.
"Quasi–epitaxial growth of diacetylene films by vaccuum deposition" by T. Kanetake et al., J. Appl. Phys., vol. 72, No. 3, Aug. 1, 1992.
"Development and Properties of Polyimide Optical Waveplates" by T. Sawada et al., Technical Report of IEICE, EDM94–39, CPM94–53, OPE94–48 (Aug. 1994), pp. 67–72.
"Development of 7.3mm Height DVD Optical Pickup Using TWIN–LD" by Takeshi Ebihara et al., 7th Microoptics Conference (MOC '99), Makuhari, Japan, Jul. 14–16, 1999, pp. 6–9.

*Primary Examiner*—Leo Boutsikaris
(74) *Attorney, Agent, or Firm*—Dickstein Shapiro Morin & Oshinsky LLP

(57) ABSTRACT

An optical pickup unit includes a light source of semiconductor laser chips of different light-emission wavelengths; a plurality of holograms placed between the light source and an optical recording medium, the holograms including at least one non-polarization hologram having a substantially uniform diffraction efficiency irrespective of the direction of polarization of incident light and at least one polarization hologram having a diffraction efficiency varying depending on the direction of polarization of incident light; and a wave plate provided between the optical recording medium and the polarization hologram. The returning beam of a light beam emitted from a selected one of the semiconductor laser chips is diffracted by the corresponding one of said holograms to be received by a light-receiving element. The wave plate turns the direction of polarization of the returning beam to a different direction from that of the emitted light beam.

32 Claims, 23 Drawing Sheets

U.S. PATENT DOCUMENTS

| | | |
|---|---|---|
| 5,481,636 A | 1/1996 | Fukuda et al. |
| 5,684,779 A | 11/1997 | Ohuchida et al. |
| 5,894,464 A * | 4/1999 | Kim et al. .............. 369/112.12 |
| 5,956,302 A | 9/1999 | Maeda et al. |
| 6,072,579 A | 6/2000 | Funato |
| 6,366,548 B1 * | 4/2002 | Ohyama ................ 369/112.04 |
| 2001/0026523 A1 | 10/2001 | Ohuchida et al. |
| 2002/0003755 A1 | 1/2002 | Fujita et al. |
| 2002/0018432 A1 | 2/2002 | Ohuchida |
| 2002/0018433 A1 | 2/2002 | Ohuchida |
| 2002/0093902 A1 | 7/2002 | Hirai et al. |
| 2002/0196726 A1 * | 12/2002 | Takeda .................. 369/112.04 |
| 2004/0001419 A1 * | 1/2004 | Ariyoshi et al. ....... 369/112.04 |

* cited by examiner

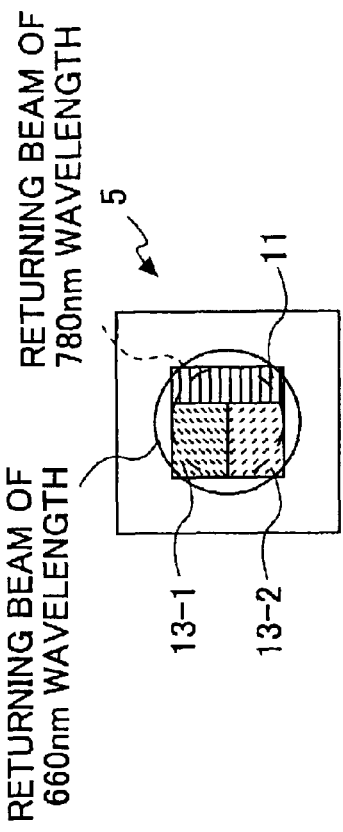
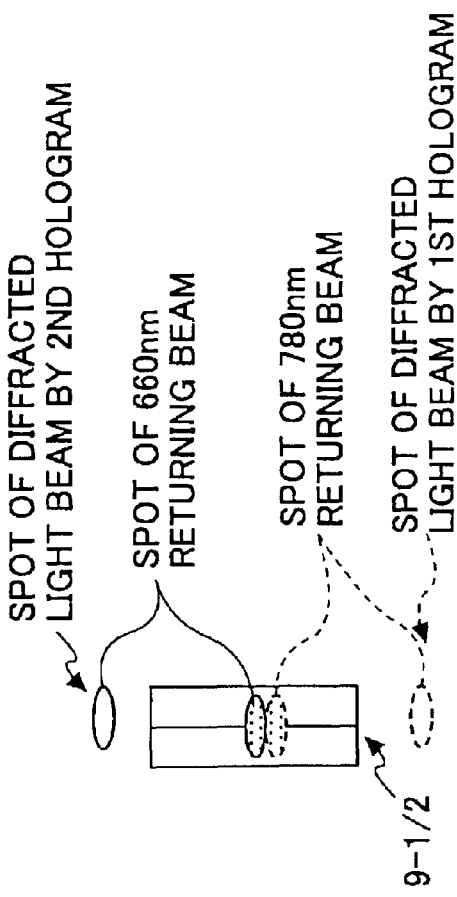

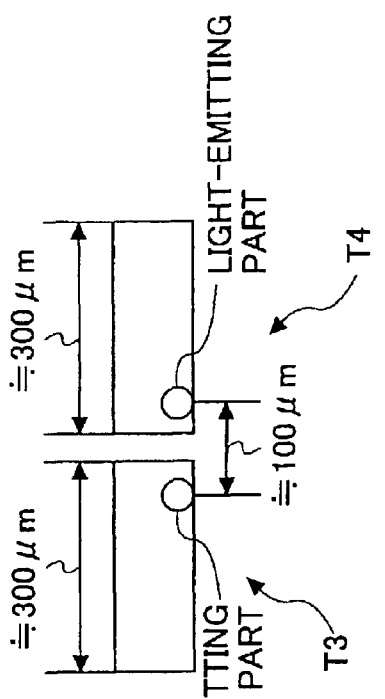
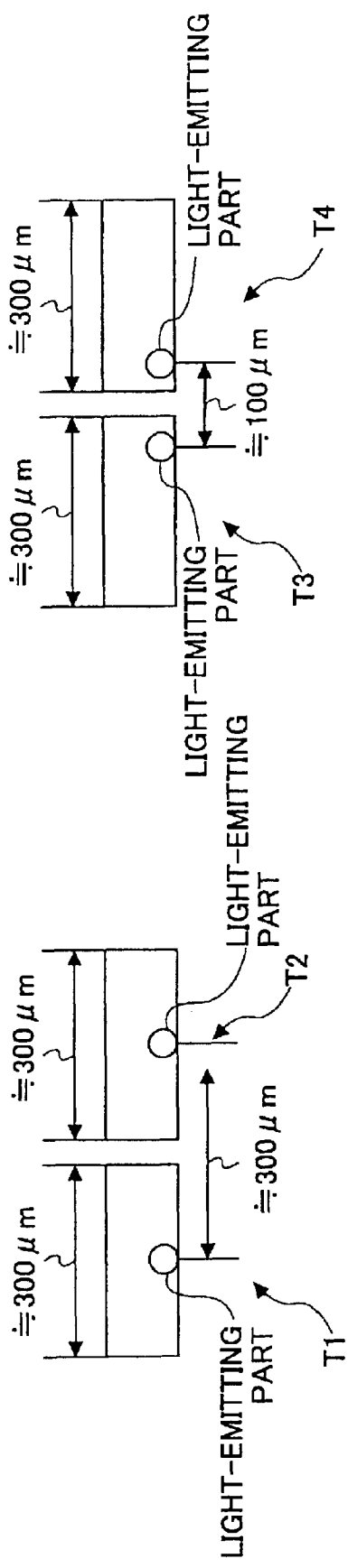
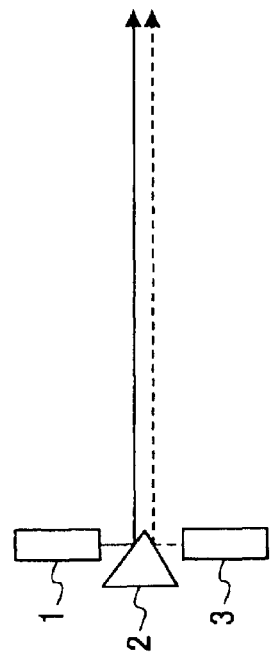

WAVELENGTH : 660nm

WAVELENGTH : 780nm

OPTICAL PICKUP UNIT AND OPTICAL DISK DRIVE FOR ACCURATE AND STABLE INFORMATION RECORDING AND REPRODUCTION

BACKGROUND OF THE INVENTION

1. Field of the Invention

The present invention relates to optical pickup units and optical disk drive units, and more particularly to an optical pickup unit that emits light beams of different wavelengths to the recording surfaces of different types of information recording media and receives reflected lights therefrom, and an optical disk drive unit employing such an optical pickup unit.

2. Description of the Related Art

An optical pickup unit that is designed for both a DVD-type optical recording medium using a 650 nm wavelength $\lambda_1$, such as a digital video disk, and a CD-type optical recording medium using a 780 nm wavelength $\lambda_2$, such as a compact disk, has been put to practical use. Such an optical pickup unit employs, as its light source, a semiconductor laser chip manufactured as a "monolithic chip" emitting light beams of the respective wavelengths $\lambda_1$ and $\lambda_2$ (hereinafter referred to as a "dual-wavelength monolithic chip"), or a package of different semiconductor laser chips emitting laser beams of the respective wavelengths $\lambda_1$ and $\lambda_2$ in order to use in common the optical system in the optical path from the light source to the optical recording medium.

In the dual-wavelength monolithic chip, the respective light-emitting parts can be positioned close to each other. It is not easy, however, to position the light-emitting parts relative to each other with accuracy, thus making it difficult to increase the manufacturing yield of the chip. Further, in the case of containing the light source and a "light-receiving element receiving a returning beam" in one package, heat from the dual-wavelength monolithic chip makes it difficult for the light-receiving element to operate at high speed if the light-emitting parts are positioned with a small distance between each other. Therefore, it is difficult to apply the dual-wavelength monolithic chip in the case of recording information on an optical recording medium or reproducing information therefrom at high speed.

On the other hand, in the case of containing semiconductor laser chips of different light emission wavelengths in a single package, the semiconductor laser chips having desired outputs for the respective, wavelengths can be used. Therefore, the best semiconductor laser chip can be used in accordance with the specifications of the optical disk drive unit. Accordingly, a high-speed optical disk drive unit can be realized at low cost.

However, since the semiconductor laser chips are individually mounted in this type of light source, an error is caused in the mounting of the semiconductor laser chips. Therefore, the accuracy of spacing the two light-emitting parts is likely to be decreased. Such a decrease in the spacing accuracy is likely to incur a decrease in the signal detection accuracy of the light-receiving element.

Some optical recording media have substrates of high birefringence. Therefore, in the case of using an optical disk drive unit in common between a plurality of types of optical recording media using different wavelengths, there is the problem of "deterioration in detection signals", which is a variation caused in detection signals such as reproduction, focus, and tracking signals by the effect of birefringence when information is recorded on or reproduced from an optical recording medium having a substrate of high birefringence.

An optical disk unit uses an information recording medium such as an optical disk. The optical disk unit records information on the information recording medium by focusing a laser beam onto its recording surface on which a spiral track or concentric tracks are formed. The optical disk unit reproduces information from the optical recording medium based on a reflected light from its recording surface. The optical disk unit includes an optical pickup unit as a device for emitting the laser beam into a beam spot on the recording surface of the optical recording medium and receiving the reflected light therefrom.

Normally, the optical pickup unit includes an objective lens guiding a light beam emitted from a light source to the recording surface of the optical recording medium, an optical system guiding the light beam reflected from the recording surface as a returning beam to a predetermined light-receiving position, and a light-receiving element provided at the predetermined light-receiving position. The light-receiving element outputs a signal including not only the reproduced information of data recorded on the recording surface, but also information necessary for controlling the optical pickup unit itself and the position of the objective lens (servo information).

In order to correctly record data at a predetermined position on the recording surface or correctly reproduce data recorded at a predetermined position on the recording surface, it is necessary to form the laser spot at the predetermined position with accuracy. For this purpose, it is required to detect the position at which the laser spot is formed. A variety of methods of detecting a laser spot formation position on the recording surface by using the returning beam reflected therefrom have been proposed, and some of the methods have been put to practice.

The methods of detecting a laser spot formation position on the recording surface can be classified roughly into the following two types. One type uses a returning beam from one beam spot formed on the recording surface. A method of this type is called a one-beam method. The other type uses returning beams from three beam spots formed on the recording surface. A method of this type is called a three-beam method. In the case of using the three-beam method, the light beam emitted from the light source is split into three beams to form the three beam spots on the recording surface.

Of one-beam methods, a so-called push-pull method and a phase difference method are commonly used, while a so-called three-spot method and a differential push-pull method are commonly used three-beam methods.

The push-pull method divides the returning beam into two parts in a direction corresponding to the tangential direction of the track and detects the deviation of a beam spot position (a so-called tracking error signal) from the difference between the amounts of light of the two parts.

The phase difference method detects a tracking error signal based on the rotational change of the intensity pattern of the returning beam. That is, the returning beam is detected by a light-receiving elements divided into four parts, and obtains a phase lead and a phase lag based on signals each representing the sum of the amounts of light received by a corresponding pair of light-receiving element parts positioned diagonally to each other. Thereby, the tracking error signal is obtained.

According to the three-spot method, the light beam emitted from the light source is divided into one main (primary)

beam and two sub (secondary) beams. The light beam is emitted so that the main beam and the sub beams are focused onto the recording surface into respective laser spots that are equally spaced a quarter track pitch apart in the tracking directions, which are directions perpendicular to the tangential directions of the track. The returning beams of the two sub beams reflected back from the recording surface are received by their respective light-receiving elements, so that a tracking error signal is detected from the difference between the amounts of light received by the two light-receiving elements.

According to the differential push-pull method, the light beam emitted from the light source is divided into one main beam and two sub beams. The light beam is emitted so that the main beam and the sub beams are focused onto the recording surface into respective laser spots that are equally spaced a half track pitch apart. The returning beams of the main beam and the sub beams reflected back from the recording surface are received by three respective light-receiving elements each divided into two parts. Then, a push-pull signal is obtained in each of the light-receiving elements, and a tracking error signal is obtained from a signal representing the difference between the push-pull signal of the main beam and a signal representing the sum of the push-pull signals of the two sub beams.

In the optical disk unit, when the objective lens is moved in-the tracking directions to form the beam spot accurately at the predetermined position on the recording surface, that is, when so-called tracking control is performed, the tracking error signal is detected as described above from the output signal of each light-receiving element, and is fed back to control the position of the objective lens in the tracking directions.

In recent years, DVDs (Digital Versatile Disks) much larger in recording capacity than CDs (Compact Disks) have been widely used. A laser beam of a 780 nm wavelength is used for CD recording and reproduction, and a laser beam of a 650 nm wavelength is used for DVD recording and reproduction. Therefore, conventionally, an optical disk unit for the CDs and an optical disk unit for the DVDs have been used as independent peripheral devices for an information apparatus such as a personal computer.

As the information apparatus has become smaller in size and lighter in weight, demand for an optical disk unit that can access both DVDs and CDs has increased. In this case, in order to accommodate both DVDs and CDs, the optical pickup unit is required to include, as light sources, a semiconductor laser emitting the laser beam of 650 nm wavelength (hereinafter this semiconductor laser is also referred to as "a DVD light source") and a semiconductor laser emitting the laser beam of 780 nm wavelength (hereinafter this semiconductor laser is also referred to as "a CD light source"). The optical disk unit is required to further include an optical system for detecting each of the laser beams. However, if optical systems are separately provided for the 650 nm and 780 nm wavelengths, there is the disadvantage that the optical pickup unit becomes larger in size. Hereinafter, such an optical pickup unit having light sources of two different wavelengths is also referred to as a "two-wavelength optical pickup unit."

For instance, a small-scale two-wavelength optical pickup unit that can perform both DVD and CD reproduction by using a two-wavelength integrated laser diode (TWIN-LD) into which the DVD and CD light sources are monolithically integrated is disclosed in "Development of 7.3 mm Height DVD Optical Pickup Using TWIN-LD" described in pp. 6 to 9 of the preliminary reports of the 7$^{th}$ Microoptics Conference held in July 1999 (hereinafter referred to as "first prior art"). This optical pickup unit includes an LD-PD assembly formed by packaging the TWIN-LD and a light-receiving element (a photodiode (PD)) in a housing, a grating element that divides only a light beam emitted from the CD light source into three beams, and one hologram that guides each of the returning beams of the respective wavelength to the light-receiving element. A tracking error signal is detected by the above-described phase difference method for the DVDs and by the above-described three-spot method for the CDs.

Japanese Laid-Open Patent Application No. 2001-216677 (hereinafter referred to as "second prior art") discloses a low-cost two-wavelength optical pickup unit that can perform both DVD and CD reproduction by using the DVD and CD light sources, an information reproduction apparatus using the same, and an information recording and reproduction apparatus using the same. In the optical pickup unit of the second prior art, each of the light beams emitted from the DVD and CD light sources is divided into three beams by using two diffraction gratings with wavelength selectivity. Each of the returning light beams of the respective wavelengths is diffracted by one diffraction grating for signal detection, so that the diffracted light is received by a light-receiving element. A tracking error signal is detected by the above-described phase difference method for DVD-ROMs, by the above-described differential push-pull method for DVD-RAMS, and by the above-described three-spot method for the CDs.

Japanese Laid-Open Patent Application No. 2000-76689 (hereinafter referred to as "third prior art") discloses a two-wavelength optical pickup unit that can perform both DVD and CD recording and reproduction by using the DVD and CD light sources. In the optical pickup unit of the third prior art, at least one of the light beams emitted from the DVD and CD light sources is divided into three beams by one diffraction grating for division. The optical pickup unit of the third prior art includes a first hologram element optimized for the light beam of 650 nm wavelength and a second hologram element optimized for the light beam of 780 nm wavelength, so that the light beams of 650 nm and 780 nm wavelengths are diffracted by the first and second hologram elements, respectively, toward a light-receiving element. A tacking error signal is detected by the three-spot method With respect to the light beam divided into the three beams and by the push-pull method with respect to the single light beam (not divided into three beams).

As information to be recorded on optical recording media is increasingly diversified, attempts have been made to perform information recording and reproduction at higher rates. Particularly, the DVDs, which have high recording density, need tracking control at higher speed with more accuracy if the recording rate is to increase.

In the case of the first prior art, this poses no problem if the optical pickup unit is used only for reproduction. If the optical pickup unit is also used for recording, however, recording may not be performed with accuracy, particularly, in the case of DVD recording. This is because a tracking error signal is detected by the phase difference method in the case of the DVDs so that an offset component may be added to tracking error information output from the light-receiving element because of the deviation of the optical axis of the returning beam caused by the shift of the objective lens. Further, since the light sources are integrated monolithically, it is difficult to increase the output of each light source, for instance, to a 100 mW level. Therefore, the optical pickup unit of the first prior art has difficulty in operating at high recording and reproduction rates.

In the second prior art, the tracking error signal is detected by the three-spot method for the CDs. Therefore, an offset component may be added to the output signal of the light-receiving element due to an inclination of the optical disk in the tracking directions, thereby preventing accurate recording. Further, the light sources are provided in the same package, but the light-receiving element is provided not in the package but in another position. Therefore, the optical pickup unit is not satisfactorily downsized.

In the third prior art, each of the light beams emitted from the respective light sources is divided into three beams by the single diffraction grating for division. This makes it difficult to focus both 650 nm and 780 nm light beams accurately on predetermined positions on the recording surfaces, of DVD and CD disks, respectively. Further, the tracking error signal is detected by the three-spot method with respect to each light beam divided into three beams. Therefore, an offset component may be added to the output signal of the light-receiving element due to an inclination of the optical disk in the tracking directions, thus preventing accurate recording.

SUMMARY OF THE INVENTION

Accordingly, it is a general object of the present invention to provide an optical pickup unit in which the above-described disadvantages are eliminated and an optical disk drive unit employing such an optical pickup unit.

A more specific object of the present invention is to provide an optical pickup unit that can perform excellent signal detection with respect to each of the different light-emission wavelengths of a plurality of semiconductor laser chips provided in a package as a light source even if the light-emitting parts of the semiconductor laser chips are positioned with less accuracy, can effectively reduce the deterioration of a detected signal due to the influence of the birefringence of the substrate of an optical recording medium, can increase the usability of light, and can operate at high speed.

Another more specific object of the present invention is to provide an optical pickup unit that can be used for a plurality of types of information recording media and can accurately obtain tracking error information without an increase in size and cost.

Yet another more specific object of the present invention is to provide an optical disk drive unit employing such an optical pickup unit so as to be usable for a plurality of types of information recording media and perform accurate recording with stability.

The above objects of the present invention are achieved by an optical pickup unit for performing at least one of information recording, reproduction, and erasure, the optical pickup unit including: a light source of a plurality of semiconductor laser chips of different light-emission wavelengths; a plurality of holograms provided to respective substrates, the holograms being placed between the light source and an optical recording medium, the holograms including at least one non-polarization hologram having a substantially uniform diffraction efficiency irrespective of a direction of polarization of incident light and at least one polarization hologram having a diffraction efficiency varying depending on a direction of polarization of incident light; and a wave plate provided closer to the optical recording medium than the polarization hologram is, wherein a light beam emitted from a selected one of the semiconductor laser chips passes through the holograms to be focused onto a recording surface of the optical recording medium and reflected therefrom as a returning beam, the returning beam is diffracted by a corresponding one of the holograms so that a diffracted light of the returning beam is received by a light-receiving element, and the wave plate turns a direction of polarization of the returning beam to a different direction from that of the light beam emitted from the selected one of the semiconductor laser chips.

In the above-described optical pickup unit, the positioning accuracy of the light-emission parts of the semiconductor laser chips in the light source may be lower than that of the two-wavelength monolithic chip. However, by individually adjusting the holograms, focus and tracking control can be performed with respect to each of the different wavelengths, so that an excellent signal with a reduced offset can be detected.

Further, by including at least one non-polarization hologram and at least one polarization hologram, a returning beam of a wavelength used for an optical disk (optical recording medium) whose substrate has large birefringence is diffracted by the non-polarization hologram to be detected so that a variation caused by the birefringence of the disk substrate may be reduced, and a returning beam of another wavelength used for another type of optical disk is diffracted by the polarization hologram to be detected so that the light beam emitted from the light source can be focused onto the optical disk with increased power and the amount of light of the returning beam received by the light-receiving element can be increased. Thereby, the optical pickup unit of the present invention can be used for high-speed recording and reproduction.

The above objects of the present invention are also achieved by an optical disk drive unit for performing at least one of information recording, reproduction, and erasure with respect to an optical recording medium selected from disk-like optical recording media of a plurality of types using different wavelengths, the optical disk drive unit including an optical pickup unit including: a light source of a plurality of semiconductor laser chips of different light-emission wavelengths; a plurality of holograms provided to respective substrates, the holograms being placed between the light source and the optical recording medium, the holograms including at least one non-polarization hologram having a substantially uniform diffraction efficiency irrespective of a direction of polarization of incident light and at least one polarization hologram having a diffraction efficiency varying depending on a direction of polarization of incident light; and a wave plate provided closer to the optical recording medium than the polarization hologram is, wherein a light beam emitted from a selected one of the semiconductor laser chips passes through the holograms to be focused onto a recording surface of the optical recording medium and reflected therefrom as a returning beam, the returning beam is diffracted by a corresponding one of the holograms so that a diffracted light of the returning beam is received by a light-receiving element, and the wave plate turns a direction of polarization of the returning beam to a different direction from that of the light beam emitted from the selected one of the semiconductor laser chips.

The above objects of the present invention are also achieved by an optical pickup unit including: a plurality of light sources emitting light beams of different wavelengths; an optical system including: an objective lens focusing any of the light beams onto a recording surface of an information recording medium attached to the optical pickup unit; a plurality of grating elements provided between the light sources and the objective lens, the grating elements corresponding to the different wavelengths, respectively, and dividing the light beams of the corresponding wavelengths traveling toward the objective lens each into a plurality of beams including a $0^{th}$-order light and diffracted lights; and a plurality of holograms corresponding to the different wavelengths, respectively, and guiding to a predetermined position the light beams of the corresponding wavelengths reflected from the recording surface; and a photodetector provided at the predetermined position, wherein one of the light sources which one emits a light beam of a wavelength corresponding to a type of the attached information recording medium is selected, and the light beam emitted from the selected one of the light sources is focused onto the recording surface and reflected therefrom to be received by the photodetector.

According to the above-described optical pickup unit, the light beam emitted from each of the light sources is divided into a plurality of beams including a $0^{th}$-order light and diffracted lights by the corresponding one of the grating elements so that the beams are focused onto the recording surface of the information recording medium whose type corresponds to the wavelength of the emitted light beam. Thereby, the beam spots of the respective beams are formed on the recording surface. Each of the beams is reflected from the recording surface as a plurality of returning beams to be incident on the corresponding one of the holograms. The returning beams are diffracted by the corresponding one of the holograms so as to be detected by the photodetector provided at a predetermined position. That is, the above-described optical pickup unit includes the grating elements and the holograms corresponding to the wavelengths of the light beams emitted from the respective light sources. Therefore, tracking error information can be obtained with accuracy with respect to a plurality of types of information recording media. Further, grating elements and holograms are inexpensive small optical elements, thus preventing an increase in the size and cost of the optical pickup unit.

The above objects of the present invention are further achieved by an optical disk unit performing information recording by emitting light onto a recording surface of an information recording medium, the optical disk unit including: an optical pickup unit including: a plurality of light sources emitting light beams of different wavelengths; an optical system including: an objective lens focusing any of the light beams onto the recording surface of the information recording medium; a plurality of grating elements provided between the light sources and the objective lens, the grating elements corresponding to the different wavelengths, respectively, and dividing the light beams of the corresponding wavelengths traveling toward the objective lens each into a plurality of beams including a $0^{th}$-order light and diffracted lights; and a plurality of holograms corresponding to the different wavelengths, respectively, and guiding to a predetermined position the light beams of the corresponding wavelengths reflected from the recording surface; and a photodetector provided at the predetermined position; and a processing device performing the information recording by using an output signal of the optical pickup unit, wherein one of the light sources which one emits a light beam of a wavelength corresponding to a type of the attached information recording medium is selected, and the light beam emitted from the selected one of the light sources is focused onto the recording surface and reflected therefrom to be received by the photodetector.

According to the above-described optical disk unit, information recording can be performed on information recording media of a plurality of types with accuracy and stability.

BRIEF DESCRIPTION OF THE DRAWINGS

Other objects, features and advantages of the present invention will become more apparent from the following detailed description when read in conjunction with the accompanying drawings, in which:

FIGS. 2A through 2D are diagrams for illustrating first and second holograms and a light-receiving element of the optical pickup unit of FIG. 1;

FIGS. 3A through 3C are diagrams for illustrating a method of reducing the distance between the light-emitting parts of semiconductor laser chips of the optical pickup unit of FIG. 1;

DETAILED DESCRIPTION OF THE PREFERRED EMBODIMENTS

A description will now be given, with reference to the accompanying drawings, of embodiments of the present invention.

First Embodiment

Figure 1:
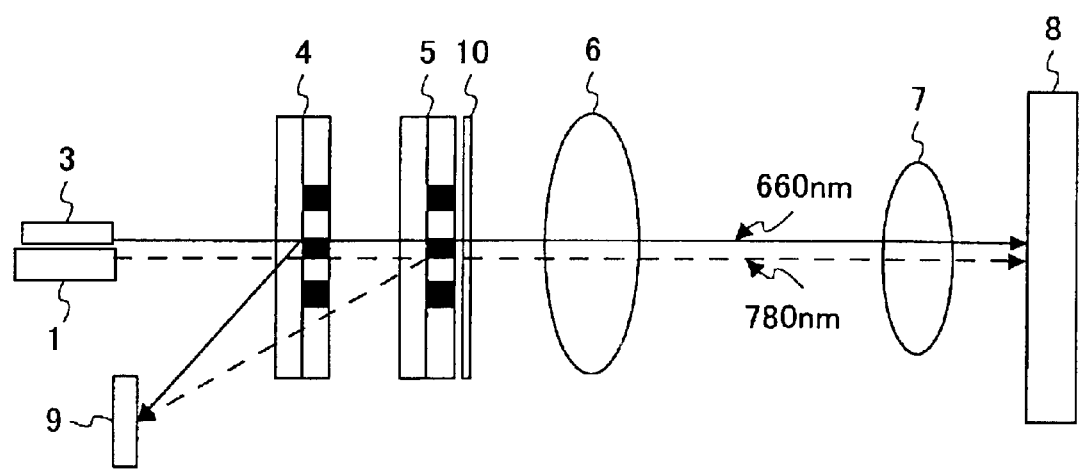
FIG. 1 is a schematic diagram showing an optical pickup unit according to a first embodiment of the present invention.

FIG. 1 is a schematic diagram showing an important part of an optical pickup unit usable for both a CD-type disk and a DVD-type disk as two types of optical recording media using different wavelengths according to the first embodiment of the present invention.

A semiconductor laser chip 1 of a 780 nm light emission wavelength and a semiconductor laser chip 3 of a 660 nm light emission wavelength are individually mounted in the optical pickup unit as a light source. When a CD-type disk is employed as an optical recording medium 8, the semiconductor laser chip 1 is actuated to emit a 780 nm light beam. The emitted 780 nm light beam passes through a first hologram 4, a second hologram 5, and a wave plate 10 to be converted by a collimator lens 6 to a bundle of parallel rays and focused onto the recording surface of the optical recording medium 8 into a beam spot by an objective lens 7.

A reflected light from the recording surface travels back in the optical path of the emitted light beam as a "returning beam" to be diffracted by the second hologram 5 and received by a light-receiving element 9. The traveling of the emitted light beam and the returning beam in this case is indicated by the broken arrow in FIG. 1.

In the case of using a DVD-type disk as the optical recording medium 8, the semiconductor laser chip 3 is actuated to emit a 660 nm light beam. The emitted 660 nm light beam passes through the first hologram 4, the second hologram 5, and the wave plate 10 to be converted by the collimator lens 6 to a bundle of parallel rays and focused onto the recording surface of the optical recording medium 8 into a beam spot by the objective lens 7.

A reflected light from the recording surface travels back in the optical path of the emitted light beam as a "returning beam" to be diffracted by the first hologram 4 and received by the light-receiving element 9. The traveling of the emitted light beam and the returning beam in this case is indicated by the solid arrow in FIG. 1.

By thus "performing signal detection by using the first and second holograms 4 and 5 for the different wavelengths, respectively," the detection conditions of the returning beams of the two wavelengths can be adjusted with far more accuracy than by a single hologram. Further, the semiconductor laser chips 1 and 3 can be mounted or positioned relative to each other with less accuracy, thereby relaxing the fabrication tolerance of the optical pickup unit. Therefore, the fabrication yield of the optical pickup unit is increased.

FIGS. 2A and 2B are diagrams showing the specific configurations of the first and second holograms 4 and 5, respectively. In the first and second holograms 4 and 5, the knife-edge method is employed as a focus-signal detection method.

The first hologram 4 diffracts the light beam of 660 nm wavelength toward the light-receiving element 9.

As shown in FIG. 2A, the first hologram 4 is composed of three hologram parts 12-1, 12-2, and 10. The hologram part 10 is a hologram for focus, and the hologram parts 12-1 and 12-2 are holograms for tracking. A dividing line between the hologram part 10 and the hologram parts 12-1 and 12-2 serves as a "knife edge." The hologram part 10 diffracts part of the returning beam of 660 nm wavelength indicated by the solid circle in FIG. 2A toward the light-receiving element 9.

As shown in FIG. 2D, the light-receiving element 9 includes a two-part light-receiving surface 9-1/2 and single light-receiving surfaces 9-3 and 9-4 provided on the left and right sides, respectively, of the two-part light-receiving surface 9-1/2. The two-part light-receiving surface 9-1/2 is provided for generating a focus signal, and the light-receiving surfaces 9-3 and 9-4 are provided for generating a tracking signal.

When the first hologram 4 is turned about the optical axis, the diffracted returning beam is displaced precessionally around the optical axis or pivots on the optical axis so that the "position of the returning beam spot" formed by the diffracted returning beam of 660 nm wavelength can be placed on the dividing line of the two-part light-receiving surface 9-1/2 as shown in FIG. 2C. Thereby, an excellent focus signal with no offset can be obtained.

The returning beam of 780 nm wavelength indicated by the broken circle in FIG. 2A is also incident on the first hologram 4. Therefore, when the semiconductor laser chip 1 emits light, the first hologram 4 diffracts the returning beam of 780 nm wavelength. The first hologram 4 has a larger angle of diffraction for the returning beam of 780 nm wavelength than for the returning beam of 660 nm wavelength. Therefore, as shown in FIG. 2C, the diffracted returning beam of 780 nm wavelength is not made incident on the two-part light-receiving surface 9-1/2 but is focused on a position farther from the optical axis than the light-receiving element 9 is. Accordingly, the diffracted returning beam of 780 nm wavelength exerts no influence on focus signal detection.

The second hologram 5 diffracts the light beam of 780 nm wavelength toward the light-receiving element 9. As shown in FIG. 2B, the second hologram 5 is composed of three hologram parts 13-1, 13-2, and 11. The hologram part 11 is a hologram for focus, and the hologram parts 13-1 and 13-2 are holograms for tracking.

A dividing line between the hologram part 11 and the hologram parts 13-1 and 13-2 serves as a "knife edge." The hologram part 11 diffracts part of the returning beam of 780 nm wavelength indicated by the broken circle in FIG. 2B toward the light-receiving element 9.

When the second hologram 5 is turned about the optical axis, the diffracted returning beam is displaced precessionally around the optical axis or pivots on the optical axis so that the "position of the returning beam spot" formed by the diffracted returning beam of 780 nm wavelength can be placed on the dividing line of the two-part light-receiving surface 9-1/2 as shown in FIG. 2C. Thereby, an excellent focus signal with no offset can be obtained.

The returning beam of 660 nm wavelength indicated by the solid circle in FIG. 2B is also incident on the second hologram 5. Therefore, when the semiconductor laser chip 3 emits light, the second hologram 5 diffracts the returning beam of 660 nm wavelength. The second hologram 5 has a smaller angle of diffraction for the returning beam of 660 nm wavelength than for the returning beam of 780 nm wavelength. Therefore, as shown in FIG. 2C, the diffracted returning beam of 660 nm wavelength is not made incident on the two-part light-receiving surface 9-1/2 but is focused on a position closer to the optical axis than the light-receiving element 9 is. Accordingly, the diffracted returning beam of 660 nm wavelength exerts no influence on focus signal detection.

The same thing is true to diffraction by the hologram parts for tracking. The returning beams of the wavelengths 660 nm and 780 nm are diffracted by the first and second holograms 4 and 5, respectively, to be made incident on the light-receiving surfaces 9-3 and 9-4 for tracking signal detection, forming their returning beam spots as shown in FIG. 2D. As in the focus signal detection, neither the returning beam of 780 nm wavelength diffracted by the first hologram 4 nor the returning beam of 660 nm wavelength diffracted by the second hologram 5 is made incident on any of the light-receiving surfaces 9-3 and 9-4 of the light-receiving element 9 due to the difference between their angles of diffraction.

In FIGS. 2C and 2D, the returning beam spots of the returning beams of 660 nm and 780 nm wavelengths are formed at vertically different positions on each of the two-part light-receiving surface 9-1/2 and the light-receiving surfaces 9-3 and 9-4. However, since the light-receiving element 9 is provided at the position where the two returning beams diffracted by the first and second holograms 4 and 5 cross each other as shown in FIG. 1, practically, the returning beam spots of the returning beams of the two wavelengths are formed at the same position on each of the two-part light-receiving surface 9-1/2 and the light-receiving surfaces 9-3 and 9-4.

By thus providing the first and second holograms 4 and 5 each including a knife edge for the returning beams of 660 nm and 780 nm wavelengths, respectively, focus and tracking adjustments can be performed for each of the different wavelengths independently. Further, even if one of the two returning beams of the undesirable wavelength is made incident on any of the first and second hologram 4 and 5, no flare is caused on the light-receiving element 9 since the returning beam of the undesirable wavelength is not made incident on the light-receiving element 9 due to the difference between the angles of diffraction for the returning beams of the different wavelengths. If the diffracted returning beam that is prevented from being incident on the light-receiving element 9 is optically detected by another light-receiving element to be used as part of the focus, tracking, or reproduction signal, the usability of light is further increased so that signal detection can be performed at higher rates.

Here, if the second hologram 5 diffracts a light beam so that the diffracted light beam is incident on the hologram formation region of the first hologram 4, the returning beam of 780 nm wavelength is re-diffracted by the first hologram 4 after being diffracted by the second hologram 5, and therefore, may be prevented from being incident on the light-receiving element 9. Accordingly, attention should be paid so that the returning beam of 780 nm wavelength diffracted by the second hologram 5 is not made incident on the hologram formation region of the first hologram 4.

In order to prevent the returning beam of 780 nm wavelength diffracted by the second hologram 5 from being made incident on the first hologram 4, the first and second holograms 4 and 5 are only required to be appropriately spaced in the direction of the optical axis. In FIG. 1, the first and second holograms 4 and 5 are spaced in the direction of the optical axis.

An optical pickup unit that can perform recording, in order to increase its usability of light, uses a collimator lens having a shorter focal length than an optical pickup unit for reproduction only. Therefore, the light-emitting parts of the semiconductor laser chips 1 and 3 are required to be spaced approximately 100 μm apart.

When the light-emitting part is not on the optical axis of the collimator lens, a light beam emitted from the collimator lens is not parallel to the optical axis, and if the collimator lens has a short focal length, the collimated light beam has a larger inclination to the optical axis so as to be made incident on the objective lens at an angle, thereby generating coma. Therefore, the light beam cannot be focused onto the recording surface of an optical recording medium into a small narrow beam spot.

In order to space the light-emitting parts of the semiconductor laser chips 1 and 3 100 μm apart, semiconductor laser chips each having its light-emitting part offset from its center may be used. As shown in FIG. 3A, each of normal semiconductor laser chips T1 and T2 has its light-emitting part provided in its center and has an external dimension of approximately 300 μm. Therefore, when these chips are arranged close to each other, their light-emitting parts are spaced approximately 300 μm apart.

Recently, semiconductor laser chips each having its light-emitting part provided in its edge part as semiconductor laser chips T3 and T4 shown in FIG. 3B have been developed. In the case of using such semiconductor chips, the distance between their light-emitting parts can be reduced to approximately 100 μm by simply arranging the semiconductor chips closely side by side. By providing the semiconductor laser chips T3 and T4 each having its light-emitting part in its edge part in parallel, the distance between the light-emitting parts can be reduced so that the light beam can be made incident on the objective lens at an angle closer to the optical axis.

FIG. 3C shows another case of reducing the distance between the light-emitting parts. In this case, the semiconductor laser chip 1 of 780 nm light emission wavelength and the semiconductor laser chip 3 of 660 nm light emission wavelength are provided to oppose each other. Their respective emitted light beams are reflected by the corresponding adjacent surfaces of a composite mirror 2 so as to be parallel light beams close to each other with a light beam distance (between their respective principal rays) of approximately 100 μm. Thereby, light beams close to each other with a distance of approximately 100 μm can be formed easily even with the normal semiconductor laser chips each having its light-emitting part positioned in its center.

When a light beam emitted from a light source toward an optical recording medium and a reflected light back from the optical recording medium are polarized in the directions perpendicular to each other by a wave plate, and polarization holograms are employed, each of the light beams of 660 nm and 780 nm wavelengths emitted from the light source is transmitted by approximately more than 95% to be focused onto the optical recording medium, and each of their returning beams is diffracted by approximately more than 40% as a $+1^{st}$-order diffracted light. Therefore, the usability of light in this case is effectively increased compared with the case where normal holograms are employed.

Accordingly, by using polarization holograms, the transmittance of light is increased in the optical path to the optical recording medium so that the recording rate can be increased, while the diffraction efficiency is increased so that the returning beam can be detected with high signal-to-noise (S/N) ratio, thereby increasing the reproduction rate. That is, it is effective to use polarization holograms to increase the recording and reproduction rates of the optical disk drive unit.

From the above-described viewpoint, it is effective to use polarization holograms for both of the first and second holograms 4 and 5 in the optical pickup unit of FIG. 1 in order to increase the recording and reproduction rates. However, the optical pickup unit of FIG. 1 is designed for the CD-type and DVD-type disks, and the following problem is caused in the case of using polarization holograms for both of the first and second holograms 4 and 5 in this combination of optical recording media.

That is, if a polarization hologram is employed for the second hologram 5 in the case of performing data recording on or data reproduction from the CD-type disk, whose substrate generally has a relatively high birefringence, a phase difference caused by birefringence in the disk substrate is added to a phase difference provided by the wave plate 10 in the returning beam, so that the returning beam is elliptically polarized instead of becoming a linearly polarized light perpendicular to the direction in which the light beam emitted from the light source is linearly polarized, and is made incident on the second hologram 5.

Since the polarization hologram diffracts only a polarization component that vibrates in the grating direction, the polarization component of the elliptically polarized returning beam which polarization component is in the direction perpendicular to the grating direction is not diffracted, and accordingly is not received by the light-receiving element 9.

Thus, the amount of birefringence varies depending on types of optical recording media or positions in the radial directions of an optical recording medium. Therefore, when the returning beam is diffracted by the polarization hologram to be detected, the level of the detection signal varies depending on the amount of birefringence of the disk substrate, thereby reducing the operational reliability of the optical pickup unit.

In order to avoid such a variation in the level of the detection signal caused by the birefringence of the disk substrate in the case of performing data recording, reproduction, and deletion with respect to an optical recording medium whose substrate has high birefringence, a non-polarization hologram whose transmittance and diffraction efficiency are independent of the direction of polarization may be used as a hologram for diffracting the returning beam from the optical recording medium toward the light-receiving element.

Since each of the CD-type disk and the DVD-type disk is employed as the optical recording medium 8 in the optical pickup unit of FIG. 1, a non-polarization hologram is used for the second hologram 5 that diffracts the returning beam from the CD-type disk whose substrate has high birefringence toward the light-receiving element 9, and a polarization hologram is employed as the first hologram 4 that diffracts the returning beam from the DVD-type disk toward the light-receiving element 9.

Generally, a polarization hologram and a non-polarization hologram are employed as a pair so that the returning beam may be diffracted by the non-polarization hologram in the case of performing data recording, reproduction, and deletion with respect to an optical recording medium having a disk substrate of high birefringence, and by the polarization hologram in the case of performing recording, reproduction, and deletion with respect to an optical recording medium having a disk substrate of relatively low birefringence and requiring high diffraction efficiency.

The above description is given of focus signal detection, while the tracking signal can be generated using the outputs of the light-receiving surfaces 9-3 and 9-4 of FIG. 2D by the well-known "push-pull technique". Each of the hologram parts 10, 12-1, and 12-2 of the first hologram 4 and the hologram parts 11, 13-1, and 13-2 of the second hologram 5 is designed to gather the returning beam of the corresponding wavelength without aberration and form the returning beam spot on a corresponding one of the light-receiving surfaces 9-1/2, 9-3, and 9-4 of the light-receiving element 9.

Second Embodiment

Figure 4A:
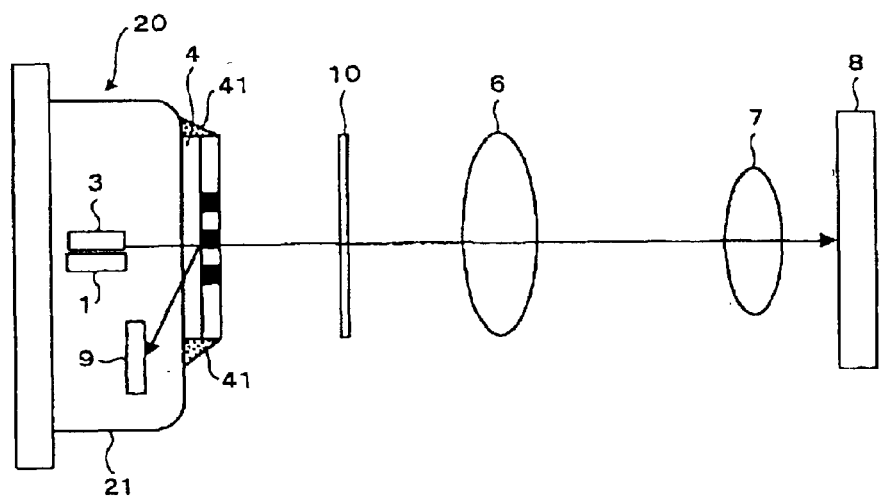
FIGS. 4A and 4B are schematic diagrams showing an optical pickup unit according to a second embodiment of the present invention.
Figure 4B:
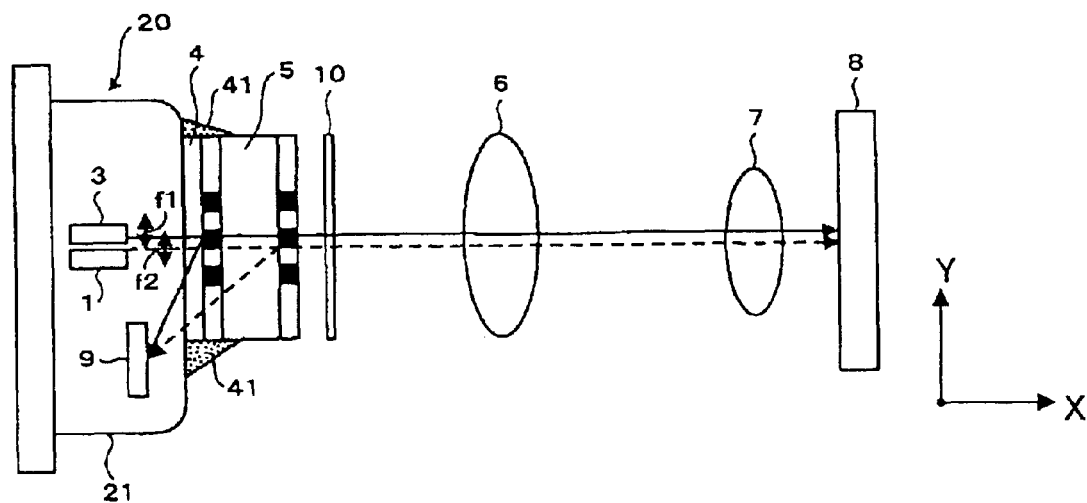

FIGS. 4A and 4B are diagrams showing an optical pickup unit according to the second embodiment of the present invention. The same elements as those of the first embodiment are referred to by the same numerals, and a description thereof will be omitted.

In the optical pickup unit of the second embodiment, two substrates on which the respective first and second holograms 4 and 5 are mounted are integrated into a unit, and the integrated substrates are further integrated with a light-source and light-receiving-element unit. A description will be given of a method of assembling a hologram unit by thus integrating the light-source and light-receiving-element unit and the two holograms.

In FIG. 4A, the semiconductor laser chip 1 of 780 nm light emission wavelength, the semiconductor laser chip 3 of 660 nm light emission wavelength, and the light-receiving element 9 are provided in a package 21, thus forming a light-source and light-receiving-element unit 20.

As shown in FIG. 4A, first, the semiconductor laser chip 3 is caused to emit light, and the first hologram 4 is placed on the cap of the package 21. The position and the orientation of the first hologram 4 are adjusted on the cap surface so that the offsets of the focus and tracking signals are set to zero. After the adjustment, the first hologram 4 is fixed to the cap by an adhesive agent 41. The assembling method of the second embodiment has been equal thus far to the conventional method of assembling a hologram unit.

Next, as shown in FIG. 4B, the semiconductor laser chip 1 is caused to emit light, and the second hologram 5 is placed on the first hologram 4. The position and the orientation of the second hologram 5 are adjusted on the first hologram 4 so that the offsets of the focus and tracking signals are set to zero. Thereafter, the second hologram 5 and the first hologram 4 are fixed by the adhesive agent 41 (added to that used in fixing the first hologram 4) so as to be integrated into a single unit. Thus, the first and second holograms 4 and 5 are integrated with the light-source and light-receiving-element unit 20 into a hologram unit.

By thus bonding the first and second holograms 4 and 5 into a single unit, an optical pickup unit smaller in size and more stable to a change over time than that having the first and second holograms 4 and 5 provided separately can be realized. Further, a completed hologram unit saves adjustment of the holograms in assembling the optical pickup unit, thus considerably simplifying the assembly process and increase the ability to massproduce the optical pickup unit.

In the optical pickup unit of FIG. 4B, the thickness of the substrate of the second hologram 5 is increased to secure a necessary space between the first and second holograms 4 and 5 so that the diffracted light by the second hologram 5 is prevented from entering the hologram formation region of the first hologram 4.

Third Embodiment

Figure 5:
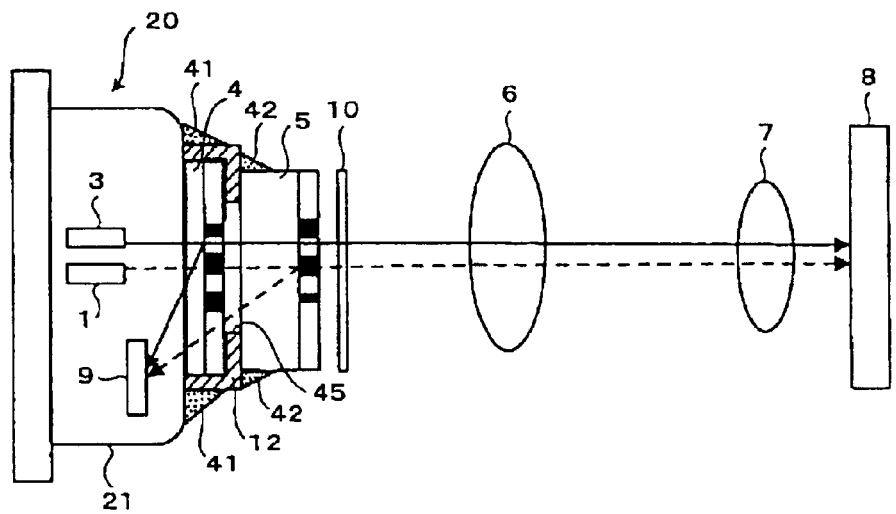
FIG. 5 is a schematic diagram showing an optical pickup unit according to a third embodiment of the present invention.

FIG. 5 is a diagram showing an optical pickup unit according to the third embodiment of the present invention. The same elements as those of the first and second embodiments are referred to by the same numerals, and a description thereof will be omitted.

In the optical pickup unit of the second embodiment, the first and second holograms 4 and 5 adhere to each other to be integrated into a single unit, while in the optical pickup unit of the third embodiment, a separator 12 may be interposed between the first and second holograms 4 and 5 so that the two substrates on which the respective first and second holograms 4 and 5 are formed are integrated with each other with a gap being formed between their respective surfaces that the light passes through without the first and second holograms 4 and 5 adhering to each other.

When the second hologram 5 is placed on the first hologram 4 after bonding the first hologram 4 to the cap of the package 21 of the light-source and light-receiving-element unit 20 as in the second embodiment, the first and second holograms 4 and 5 have their respective glass surfaces adhering to each other. The better glass surface accuracy, the stronger adhesion. Therefore, when the second hologram 5 is moved for positioning, a force is applied so as to move the first hologram 4 adhering to the second hologram 5 as well. Accordingly, the bonded and fixed first hologram 4 may be displaced to come off the cap or to be in a wrong position, thus causing a defect in the hologram unit. Therefore, the yield of the hologram unit may be decreased.

In the third embodiment, the separator 12 having an opening is integrated with the first hologram 4 into a unit, and the unit is fixed to the cap of the package 21 of the light-source and light-receiving-element unit 20 by the adhesive agent 41 after the position and the orientation of the unit is adjusted on the cap. Next, the second hologram 5 is placed on the separator 12. The intervention of the separator 12 prevents the glass surfaces of the first and second holograms 4 and 5 from coming into contact with each other so that the first and second holograms 4 and 5 are integrated into a unit with an air layer (gap) 45 being formed therein. When the second hologram 5 is positioned, the second hologram 5 is moved on the separator 12. Therefore, the first hologram 4 is prevented from moving together with the second hologram 5. Accordingly, the first hologram 4 is precluded from coming off the cap, thus increasing the yield of the hologram unit. After the adjustment of the second hologram 5, the second hologram 5 is bonded and fixed to the separator 12 by an adhesive agent 42, so that the first and second hologram units 4 and 5, the separator 12, and the light-source and light-receiving-element unit 20 are all integrated into a hologram unit.

In each of the above-described first through third embodiments, the first hologram 4 is a polarization hologram and the second hologram is a non-polarization hologram. The polarization hologram may be characterized so as to diffract approximately all of a first component of the incident light in its first direction of polarization and transmit approximately all of a second component of the incident light in its second direction of polarization, the first and second directions of polarization being perpendicular to each other. In order to provide the polarization hologram with this characteristic, the polarization hologram may be formed by forming a grating of grooves on a birefringent material and filling the grooves with an isotropic material.

That is, the polarization hologram is configured so that the refractive index varies periodically in the direction of the grating arrangement with respect to one of polarized lights in two directions crossing at right angles on the substrate surface and the refractive index is generally uniform without variation with respect to the other one of the polarized lights. Thereby, the polarized light vibrating in the direction of a periodic variation in the refractive index is almost totally diffracted, and the light polarized in the direction perpendicular to the direction of the periodic vibration of the refractive index is almost totally transmitted.

Such a polarization hologram can be realized by proper setting of the directions of birefringence of the birefringent material, the direction of formation of the grating, and the refractive index of the isotropic material.

A description will be given of the birefringent material forming the above-described polarization hologram. Conventionally well-known birefringent crystalline materials such as $LiNbO_3$ and $CaCO_3$ have a disadvantage in terms of cost. A so-called "obliquely deposited film" is known as a birefringent film that can be realized at low cost.

Figure 6:
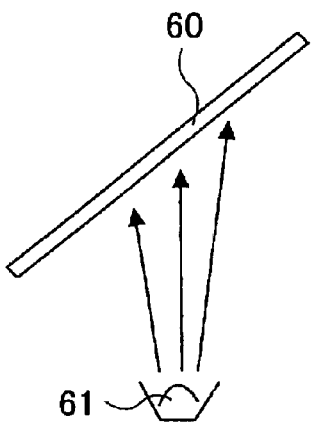
FIG. 6 is a diagram for forming a birefringent film by oblique deposition.

As shown in FIG. 6, the obliquely deposited film can be obtained by vacuum-depositing a dielectric material on a substrate 60 that is inclined to an evaporation source 61. As described in "Phase Difference Film" by Taga of Toyota Central R&D Labs., Inc. carried in "Surface Finishing Vol. 46, No. 7, 1995," a film having a birefringence Δn (=np−ns) of approximately 0.08 can be formed by vapor-depositing a dielectric material such as $Ta_2O_5$ or $SiO_2$ on an inclined substrate.

The obliquely deposited film has a birefringence equal to the birefringence Δn of a $LiNbO_3$ crystal, but can be manufactured over a large area easily by vacuum deposition. Therefore, the polarization hologram can be manufactured with the obliquely deposited film at much lower cost than with the $LiNbO_3$ crystal. Further, the obliquely deposited film has a very small thickness of approximately 10 μm or less compared with the $LiNbO_3$ crystal, which has a thickness of approximately 500 to 1000 μm. Therefore, the obliquely deposited film can limit aberration generated to a very small amount even in a divergent bundle of rays. The obliquely deposited film, which is a phase difference film, can be used as a wave plate The birefringent film may be obtained easily by using a highly-oriented organic film. For instance, an oriented film is obtained by rubbing with a cloth a SiO film deposited on an inclined transparent glass substrate or an organic film of polyethylene terephthalate (PET). Then, polydiacetylene monomers are vacuum-deposited on the oriented film to be oriented. Thereafter, the polydiacetylene monomers are irradiated with ultraviolet rays to be polymerized into an isotropic film (J. Appl. Phys., Vol. 72, No. 3, pp.938, 1992). An organic birefringent film can be produced at low cost by this method.

Figure 7:
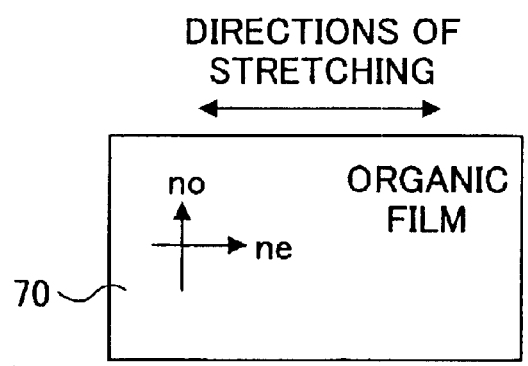
FIG. 7 is a diagram for illustrating a stretched organic film.

According to another method of obtaining a birefringent film, as shown in FIG. 7, the molecular chains of a polyimide, polycarbonate, PET, or polyethylene film 70 are stretched to be oriented along an axial direction so that "in-plane" birefringence may be generated. The birefringence Δn inside the plane can vary depending on temperatures or applied forces at the time of stretching the molecular chain. According to this method, the birefringent film may be produced at low cost on a large scale ("Development and Characteristics of Polyimide Optical Wave Plate" by Sawada et al. of NTT Corp., Technical Report of the Institute of Electronics, Information and Communication Engineers (IEICE), 1994-08).

Hologram processing is performed on the birefringent film obtained as described above so that grooves are formed on the surface of the birefringent film by etching. Then, the surface of the birefringent film is planarized by filling the grooves with a material of an isotropic refractive index so that a polarization hologram of high efficiency can be realized at low cost. The above-described organic film can also be used as a wave plate.

Figure 8:
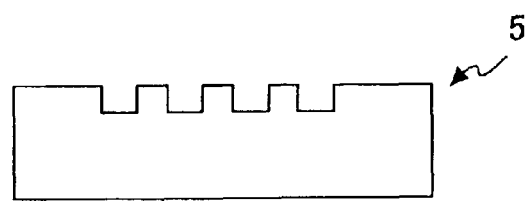
FIG. 8 is a diagram for illustrating a non-polarization hologram according to the present invention.

In each of the above-described first through third embodiments, the second hologram 5 is a non-polarization hologram. As shown in FIG. 8, the second hologram 5 (non-polarization hologram) has a structure such that a hologram having a grating of grooves is formed on a transparent glass or plastic substrate. The transmittance of $0^{th}$-order light and the diffraction efficiency of $1^{st}$-order diffracted light can be controlled by changing the depth of the grooves so that no change is caused in the efficiency by the polarization direction of the incident light.

The non-polarization second hologram 5 can be manufactured by forming a hologram pattern on a glass substrate by photolithography and transferring the hologram pattern onto the substrate. Further, the non-polarization second hologram 5 can be formed of plastic by injection molding. The non-polarization second hologram 5 can be produced at low cost on a large scale by either method.

It is desirable that the non-polarization second hologram 5 be characterized so as to generate a $1^{st}$-order diffracted light with respect to a light beam of a "wavelength desired to be detected without polarization (the 780 nm wavelength in the embodiments of the present invention)" due to the large birefringence of a disk substrate from which the light beam is reflected and to generate no $1^{st}$-order diffracted light with respect to a light beam of another wavelength (the 660 nm wavelength in the embodiments of the present invention). Thereby, no loss is caused in the light beam of the wavelength (660 nm) that may be detected with polarization.

Figure 9:
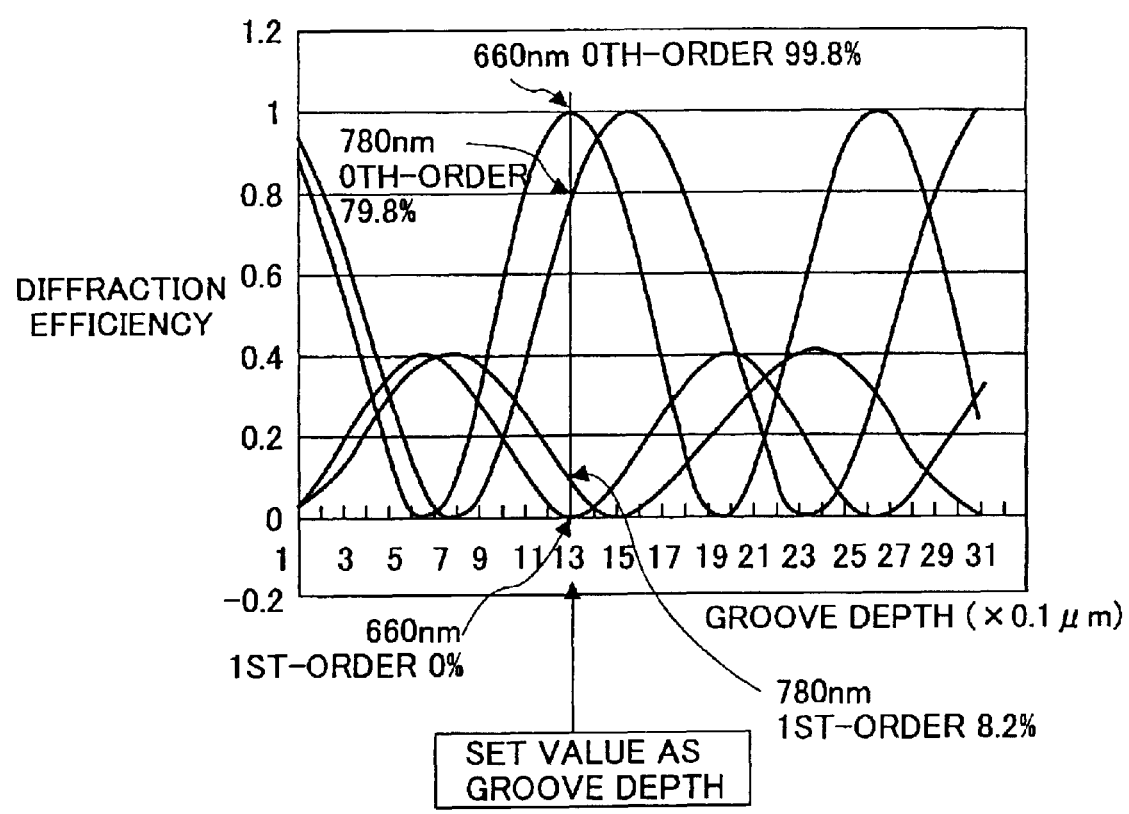
FIG. 9 is a graph for illustrating diffraction characteristics of the non-polarization hologram according to the present invention.

The non-polarization second hologram 5 having such a characteristic can be realized by adjusting the depth of the grooves of the non-polarization second hologram 5 shown in FIG. 8. FIG. 9 is a graph showing the relationship between groove depth (horizontal axis) and diffraction efficiency (vertical axis) in the case of using glass (BK7) as a substrate on which a hologram grating is formed. In this case, the width of each groove is equal to that of a part formed between each adjacent grooves.

In order to generate a $+1^{st}$-order diffracted light in the light beam of 780 nm wavelength and generate substantially no diffraction in the light beam of 660 nm wavelength, the groove depth may be set to 1.3 μm as shown in FIG. 9. At this point, the transmittance of $0^{th}$-order light for the light beam of 660 nm wavelength is 99.8%, so that substantially all of the 660 nm light beam is transmitted. On the other hand, the transmittance of $0^{th}$-order light for the light beam of 780 nm wavelength is 79.8%, while the diffraction efficiency of $+1^{st}$-order diffracted light therefor is 8.2%. Thereby, the non-polarization second hologram 5 diffracts substantially only the 780 nm light beam.

If the first hologram 4 (polarization hologram) is designed to transmit substantially all of a light beam of an approximately 660 nm (660±10 nm) wavelength from the light source side, the first hologram 4 transmits all of the light beam of the approximately 660 nm wavelength emitted from the semiconductor laser chip 3 without any substantial loss. Therefore, the usability of the light emitted onto the DVD-type disk is increased.

At this point, if a non-polarization hologram transmitting substantially all of the light beam of the approximately 660 nm wavelength is employed as the second hologram 5, the approximately 660 nm light beam passes through the first and second holograms 4 and 5 without any substantial loss to be focused onto the DVD-type disk, thereby maximizing the usability of the light emitted onto the DVD-type disk.

Further, if the direction of polarization of the returning beam of the approximately 660 nm wavelength toward the first hologram 4 is made perpendicular to the direction of polarization of the approximately 660 nm light beam emitted from the semiconductor laser chip 3 so that the first hologram 4 diffracts substantially all of the returning beam incident thereon, the returning beam can be detected with maximum efficiency. The range of the specified birefringent values of the DVD-type disks is relatively narrow, and those of inferior quality having birefringent values exceeding the specified values seldom appear on the market.

With respect to the DVD-type disk, high recording power is required for high-density recording, and signal detection should be performed with high S/N ratio due to the broad bandwidth of its reproduction signal. Therefore, it is desirable that the transmittance of the light beam emitted from the light source and the diffraction efficiency of $1^{st}$-order diffracted signal for the returning beam be high. By providing the first and second holograms 4 and 5 in the above-described configuration, the light beam is allowed to pass through the first and second holograms 4 and 5 with a minimum loss of light, and the first hologram 4 is allowed to diffract the returning beam from the DVD-type disk with a maximum diffraction efficiency so that signal detection can be performed with high S/N ratio.

On the other hand, the range of the specified birefringent values of the CD-type disks is wide, and those having large birefringent values exceeding the specified values are sold on the market. Since the second hologram 5 is a non-polarization hologram as previously described, however, the returning beam of an approximately 780 nm wavelength reflected from the CD-type disk is diffracted by the second hologram 5 irrespective of its state of polarization to be detected by the light-receiving element 9. Therefore, the detection signal is prevented from being affected by the birefringence of the disk substrate.

A description will be given, with reference to FIG. 4B, of the relationship between the above-described direction of polarization and the above-described transmittance and diffraction by the holograms. In FIG. 4B, the directions of polarization of the light beams emitted from the semiconductor laser chips 1 and 3 are parallel to the X-Y plane of FIG. 4B as indicated by the arrows f1 and f2, respectively, in FIG. 4B. The direction of polarization of a light beam is a direction in which the electric field vector of the light beam vibrates.

The orientation of the polarization first hologram 4 is adjusted so that the first hologram 4 transmits substantially all of the light beam of each wavelength having the above-described direction of polarization. Such a polarization hologram can be realized by optimizing the directions of birefringence of the above-described birefringent material and the refractive index of the isotropic material for filling the grooves formed on the birefringent material. The directions of birefringence of the birefringent material refer to the directions to advance and delay the phase of incident light on the birefringent material.

Next, the second hologram 5 (non-polarization hologram) transmits substantially all of the light beam of the approximately 660 nm wavelength and transmits approximately 80% of the light beam of the approximately 780 nm wavelength. When each of the returning beams of the respective wavelengths from the optical recording medium 8 is made incident on the second hologram 5, substantially all of the approximately 660 nm light beam passes through the second hologram 5, while 8.2% of the approximately 780 nm light beam is diffracted by the second hologram 5 to be incident on the light-receiving element 9 as a +1$^{st}$-order diffracted light and approximately 80% of the approximately 780 nm light beam passes through the second hologram 5 toward the light source.

Next, the returning beam of each wavelength is made incident on the first hologram 4. At this point, the returning beam of the approximately 660 nm wavelength has its direction of polarization turned 90° from that of the approximately 660 nm light beam emitted from the light source by the wave plate 10. Therefore, substantially all of the returning beam of the approximately 660 nm wavelength is diffracted to be made incident on the light-receiving element with high intensity of light.

On the other hand, the returning beam of the approximately 780 nm wavelength is affected by the wave plate 10, but its direction of polarization is not perpendicular to that of the approximately 780 nm light beam emitted from the light source. Therefore, the returning beam of the approximately 780 nm wavelength is partly transmitted and partly diffracted by the first hologram 4. The angle of diffraction of the returning beam of the approximately 780 nm wavelength is different from that of the returning beam of the approximately 660 nm wavelength. Therefore, the part of the approximately 780 nm returning beam diffracted by the first hologram 4 is prevented from being incident on the light-receiving element 9 as previously described.

A wave plate that provides a phase difference of 90° to each of the linearly polarized light beam of the approximately 660 nm wavelength and the linearly polarized light beam of the approximately 780 nm wavelength is technically possible. By using such a wave plate, substantially all of the approximately 780 nm returning beam incident on the first hologram 4 can be diffracted. However, it is not advantageous to employ a wave plate having such a characteristic in terms of cost.

As is well known, semiconductor laser chips have the problem of "generation of light-emission noise by a returning beam." That is, a light beam emitted from a semiconductor laser chip is reflected to be incident on the light-emitting part thereof, thereby causing a variation in the intensity of the original light beam emitted from the semiconductor laser chip.

The above-described generation of light-emission noise depends on the relationship between the direction of polarization of the light beam emitted from the semiconductor laser chip and the direction of polarization of the returning beam to the semiconductor laser chip. The generation of light-emission noise is maximized when the emitted and returning beams have the same direction of polarization and is minimized when their directions of polarization are perpendicular to each other.

In this point of view, in each of the above-described embodiments, it is preferable that the wave plate 10 provide a phase difference of 90 20 to each of the light beams emitted from the semiconductor laser chips 1 and 3, respectively, so that the emitted and returning beams of each wavelength have directions of polarization perpendicular to each other. As described above, however, it is not advantageous to employ such a wave plate in terms of cost.

Therefore, it is possible as the next best thing that a wave plate that does not provide a phase difference of 90° to the light beam of each wavelength but provides the light beam of each wavelength with a phase difference having some degree of approximation to 90° is employed, allowing the deviation of the provided phase difference from 90° as a decrease in the amount of signal light. Such a wave plate is hereinafter referred to as a "two-wavelength common wave plate."

The two-wavelength common wave plate can be configured as the previously described "obliquely deposited inorganic film or stretched organic film." A crystal plate may be used for the two-wavelength common wave plate, but aberration is generated when the crystal plate is placed in the optical path of a divergent bundle of rays since the crystal plate is as thick as approximately 1 mm. Since the thickness of the obliquely deposited inorganic film or the stretched organic film is as small as tens of micrometers or less, generation of aberration can be controlled to a small amount even when the obliquely deposited inorganic film or the stretched organic film is placed in the optical path of a divergent bundle of rays.

Figure 10A:
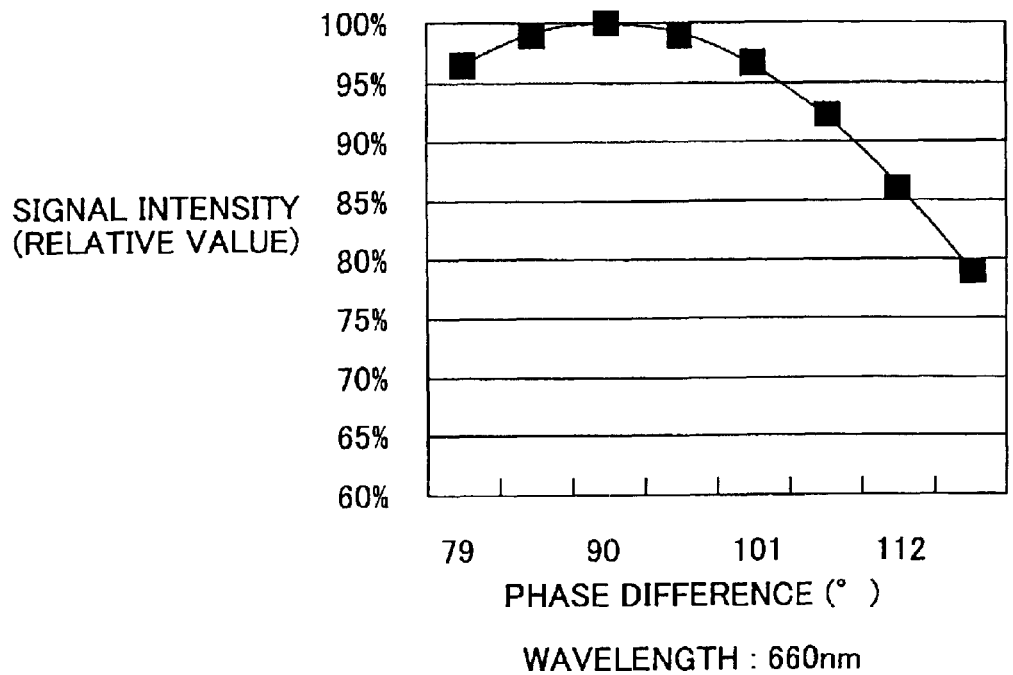
FIGS. 10A and 10B are diagrams for illustrating the relationship between phase difference provided by a wave plate and signal intensity according to the present invention.
Figure 10B:
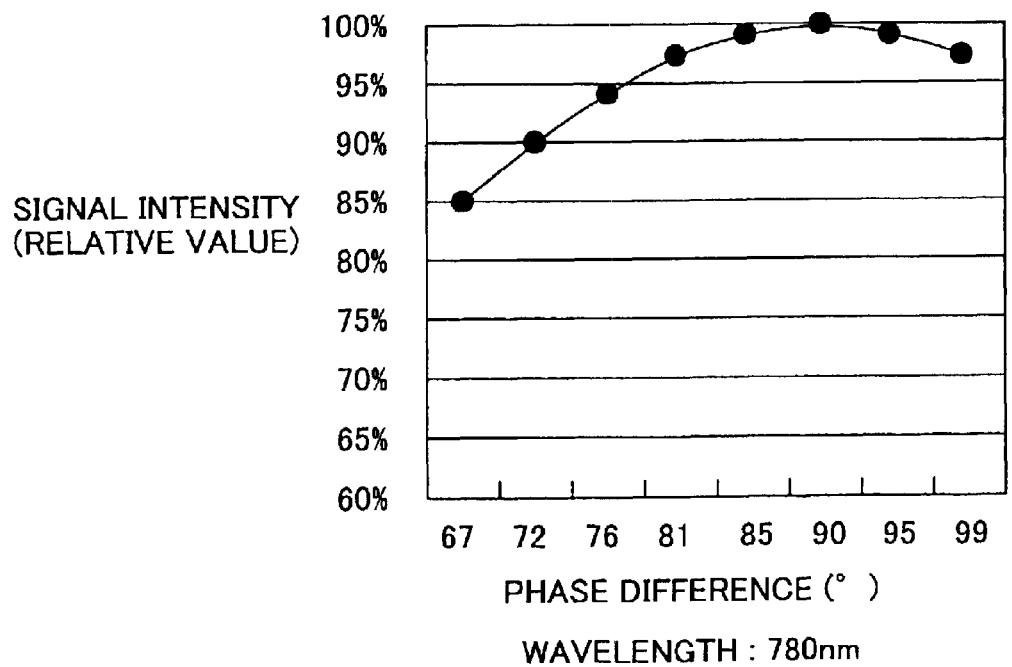

The deviation of the phase difference from 90° generated by the wave plate appears in the form of a decrease in the amount of signal light of the light diffracted by the polarization hologram. FIGS. 10A and 10B are graphs each showing the relationship between phase difference and signal intensity. The decrease in the amount of signal light means "a decrease in the amount of returning light to the light-receiving element 9," and decreases the rate of reproduction at the time of reproducing information.

If signal intensity is allowed to decrease by 10% as a decrease in the amount of signal light in signal detection by using a polarization hologram, the allowable limit of the phase difference is 109° for the approximately 660 nm light beam as shown in FIG. 10A and is 71° for the approximately 780 nm light beam as shown in FIG. 10B. Accordingly, the provided phase difference is allowed to have deviations in the range of ±19° from ideal 90°, so that a wave plate having a phase difference in the range of 90°±19° may be employed for the wavelength of a light beam diffracted to be detected. By using such a wave plate, generation of light-emission noise can be reduced in the semiconductor chip, and at the same time, signal detection can be performed with high S/N ratio.

Basically, the wave plate may be provided at any position between holograms and an objective lens. Particularly, such a thin wave plate as to generate no aberration in a divergent bundle of rays, such as the above-described wave plate of a birefringent film, can be provided between the second hologram 5 and the collimator lens 6 as shown in FIGS. 1, 4A, 4B, and 5.

In the case of providing the wave plate between holograms and a collimator lens as described above, the wave plate can be integrated with one of a plurality of substrates to which the holograms are provided. A description will be given of such a case in a fourth embodiment of the present invention.

Fourth Embodiment

Figure 11:
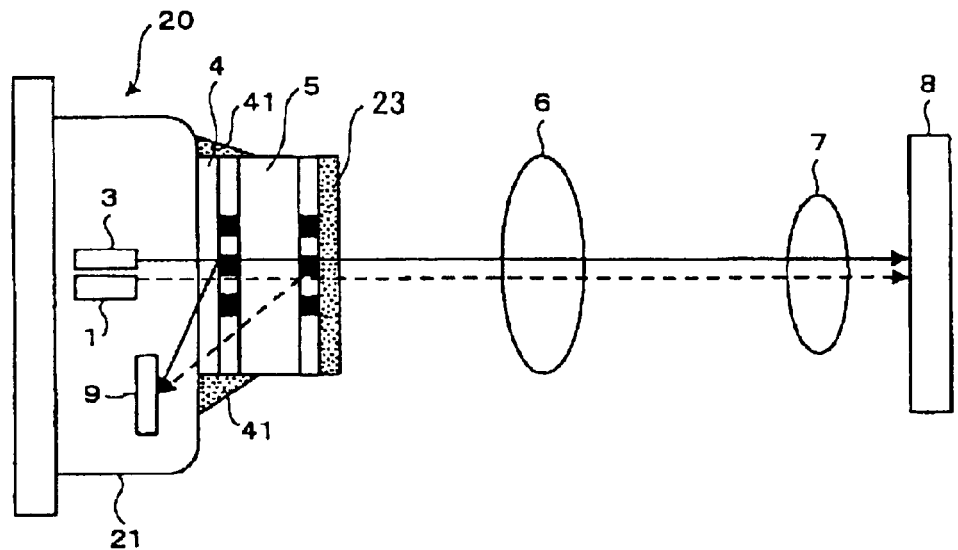
FIG. 11 is a schematic diagram showing an optical pickup unit according to a fourth embodiment of the present invention.

FIG. 11 is a diagram showing an optical pickup unit according to the fourth embodiment of the present invention. In the optical pickup unit of the fourth embodiment, a two-wavelength common wave plate 23 is integrated with the second hologram 5 on its collimator lens side. Since the first and second holograms 4 and 5 are integrated with the cap of the package 21 of the light-source and light-receiving-element unit 20 in this embodiment, the optical pickup unit is smaller in size. That is, in the fourth embodiment, the light-source and light-receiving-element unit 20, the first and second holograms 4 and 5, and the two-wavelength common wave plate 23 are integrated into the hologram unit.

In FIG. 11, the two-wavelength common wave plate 23 is integrated with the second hologram 5 that is a non-polarization hologram. This is not the only configuration, however, and the two-wavelength common wave plate 23 may be integrated with the first hologram 4 (polarization hologram) on its objective lens side, or with the second hologram 5 on its light source side.

Placing, the wave plate at a position as close to the objective lens as possible has the advantage that a light beam is less subject to the influence of the phase differences of optical components provided between the light source and the wave plate.

In each of the optical pickup units shown in FIGS. 1, 4A, 4B, 5 and 11, the first hologram 4 is a polarization hologram and is provided on the light source side, and the second hologram 5 is a non-polarization hologram and is provided on the optical recording medium side. If the first and second holograms 4 and 5 are interchanged so that the first hologram 4 is placed closer to the optical recording medium 8 that the second hologram 5 is, the returning beam of the wavelength to be detected by the non-polarization hologram (second hologram 5) is partly diffracted by the polarization hologram (first hologram 4) before being made incident on the non-polarization hologram, thus causing the problem of a decrease in the amount of light diffracted by the non-polarization hologram.

This problem is solved by providing the polarization hologram (first hologram 4) closer to the light source than the non-polarization hologram (second hologram 5) is as in each of the above-described embodiments. Thereby, highly efficient detection can be performed.

According to each of the above-described embodiments, the optical pickup unit of the present invention, which focuses a light beam selectively emitted from the light source having the semiconductor laser chips 1 and 3 of the different light-emission wavelengths onto the recording surface of the optical recording medium 8 corresponding to the wavelength of the light beam, and performs at least one of information recording, reproduction, and erasure while receiving a returning beam reflected from the recording surface by the light-receiving element 9, includes the first and second holograms 4 and 5 provided to their respective substrates between the light source and the optical recording medium 8. The light beam emitted from the light source passes through the first and second holograms 4 and 5 so as to be guided to the optical recording medium. The returning beam reflected from the recording surface is diffracted by the first hologram 4 or the second hologram 5 so that its diffracted light is received by the light-receiving element 9. The first hologram 4 is a polarization hologram whose diffraction efficiency varies depending on the direction of polarization of incident light. The second hologram 5 is a non-polarization hologram that has a substantially uniform diffraction efficiency irrespective of the direction of polarization of incident light. The optical pickup unit of the present invention further includes the wave plate 10 or 23 that turns the direction of polarization of the returning beam diffracted by the polarization hologram 4 to be guided to the light-receiving element 9 from that of the light beam emitted from the light source. The wave plate 10 or 23 is provided closer to the optical recording medium than the polarization hologram 4 is.

In an optical pickup unit, ideally, a hologram provided between a light source and an optical recording medium transmits 100% of a light beam transmitted from the light source and diffracts 100% of a returning beam. However, if a conventional hologram is designed to transmit 95%, for instance, of the light beam transmitted from the light source in order to effectively increase energy of light emission to the optical recording medium, the diffraction efficiency is approximately 2.5% at best.

However, by using the polarized hologram 4 and the wave plate 10 or 23 making the directions of polarization of the emitted and returning beams perpendicular to each other, approximately 95% of the emitted light beam can be transmitted and approximately 40% of the returning beam can be diffracted as a $+1^{st}$-order diffracted light.

In the optical pickup unit of the present invention, each of the first and second holograms 4 and 5 diffracts the light beam of the corresponding one of the different wavelengths so that the diffracted light thereof is made incident on the same light-receiving element 9.

For instance, when light beams A and B of different wavelengths emitted from a light source are diffracted by holograms HA and HB to be incident on light-receiving elements PDA and PDB, respectively, the light-receiving elements PDA and PDB, which may be provided separately, are formed into a single element so that the returning beams A and B diffracted by the holograms HA and HB, respectively, can be incident on the same single element.

By detecting the returning beams of 780 nm and 660 nm wavelengths on the common light-receiving element 9, the number of light-receiving elements can be reduced and the circuit system can be simplified, thereby realizing cost reduction. In this case, by optimizing the first and second holograms 4 and 5 with respect to the light beams of 660 nm and 780 nm wavelengths, respectively, the tracking signal and the focus signal can be optimized for each of the wavelengths.

In each of the optical pickup units of FIGS. 4A, 4B, 5, and 11, the substrates on which the first and second holograms 4 and 5 are formed are integrated with each other.

By integrating the first and second holograms 4 and 5, the optical pickup unit can be smaller in size. Further, the optical pickup function can be stabilized with respect to change over time or the influence of heat.

Particularly, in the optical pickup unit of FIG. 5, the substrates are integrated with the gap 45 formed between their respective surfaces opposing each other.

By thus integrating the first and second holograms 4 and 5 so that the surfaces of the first and second holograms 4 and 5 do not contact each other, the optical pickup unit can be smaller in size, and the optical pickup function can be stabilized with respect to change over time or the influence of heat. Further, in assembling the two holograms 4 and 5 into a hologram unit, the first hologram 4 (already provided) is prevented from being displaced or damaged by adjusting the second hologram 5 (provided after the first hologram 4) for positioning. Thereby, the yield of the hologram unit is increased.

Further, in each of the optical pickup units of the above-described embodiments, the refractive index of the polarization hologram 4 varies periodically in the direction of the grating arrangement with respect to one of polarized lights in two directions crossing at right angles on the substrate surface and is generally uniform with respect to the other one of the polarized lights.

By thus characterizing the polarization hologram 4, the usability of light can be increased.

The polarization hologram 4 can be formed as the surface structure of an obliquely deposited inorganic film as previously described or be formed of a stretched organic film as shown in FIG. 7.

By thus using an obliquely deposited inorganic film as a material for the polarization hologram 4, the polarization hologram 4 can be reduced in thickness and in cost. Further, by thus using a stretched organic film as a material for the polarization hologram 4, the polarization hologram can be reduced in cost. In the case of using any of the obliquely deposited inorganic film and the stretched organic film, the optical pickup unit can be reduced in cost.

The non-polarization hologram 5 can be formed by forming a grating of grooves on a transparent substrate.

Thereby, the non-polarization hologram 5 can be reduced in cost, which leads to cost reduction in the optical pickup unit and the optical disk drive unit.

By adjusting the depth of the grooves in the grating, the non-polarization hologram 5 can transmit substantially all of incident light of a specific wavelength and generate a first-order diffracted light with respect to another wavelength.

Thereby, the incident light of the specific wavelength can pass through the non-polarization hologram 5 without loss of light so that the amount of light focused onto the optical recording medium 8 and the amount of light received by the light-receiving element 9 are increased. Thereby, the optical pickup unit can be used for high-speed recording and reproduction. Further, with respect to the wavelength for which the first-order diffracted light is generated, the light beam can be detected without dependence on polarization, and a variation caused by the birefringence of the disk substrate in a detection signal can be controlled.

The wavelength of the light substantially all transmitted by the non-polarization hologram 5 may be set to 660 nm for DVD-type disks, and the wavelength of the light in which the first-order diffracted light is generated may be set to 780 nm for CD-type disks.

By having the non-polarization hologram 5 diffract the approximately 780 nm returning beam so that the returning beam from the CD-type disk can be detected without dependence on polarization, the influence of the birefringence of the substrate of the CD-type disk can be eliminated.

Further, by having the non-polarization hologram 5 transmit substantially all of the approximately 660 nm light beam for the DVD-type disk requiring recording power for high-density recording and a broad bandwidth for signal detection, the usability of light of the light beam is increased so as to increase power of light emission to the optical recording medium 8, and substantially all of the returning beam passes through the non-polarization hologram 5 without loss of light to be diffracted by the polarization hologram 4 with high efficiency. Thereby, the amount of light received by the light-receiving element 9 can be increased so that high-speed recording and reproduction can be realized easily.

In the optical pickup unit of FIG. 4B, the polarization hologram 4 is characterized so as to transmit substantially all of an incident light beam of a specific direction of polarization and diffract substantially all of a returning beam of a direction of polarization perpendicular to the specific direction of polarization. The directions of polarization f1 and f2 of the light beams of the different wavelengths emitted from the light source to be incident on the polarization hologram 4 are set to a direction to cause the polarization hologram 4 to transmit substantially all of an incident light beam.

By thus characterizing the polarization hologram 4, the efficiency of the polarization hologram can be maximized.

In each of the optical pickup units of the above-described embodiments, the polarization hologram 4 is provided on the light source side and the non-polarization hologram 5 is provided on the optical recording medium side in the optical path from the light source to the optical recording medium 8.

Thereby, the usability of light is increased for both of the emitted and returning beams with respect to each of the wavelengths so that high-speed recording and reproduction can be performed.

In the optical pickup unit of FIG. 11, the wave plate 23 is integrated with one of the substrates on which the first and second holograms 4 and 5 are formed.

Thereby, the optical pickup unit can be smaller in size.

In the case of using a two-wavelength common wave plate as the wave plate 23 as in the optical pickup unit of FIG. 11, the phase difference provided by the wave plate to the wavelength of a light beam diffracted to be detected is preferably set to fall within the range of $90°\pm19°$.

Ideally, the wave plate provides a phase difference to the approximately 660 nm light beam diffracted by the polarization hologram 4 toward the light-receiving element 9 so that the 660 nm light beam has directions of polarization perpendicular to each other at the time of being made incident on the optical recording medium 8 and at the time of being reflected therefrom as a returning beam. In terms of controlling generation of light-emission noise caused by the returning beam to a semiconductor laser chip, it is preferable that the wave plate provide the same phase difference to the approximately 780 nm light beam diffracted by the non-polarization hologram 5 to be received by the light-receiving element 9. It is possible to provide a phase difference of 90° to each of the light beams, but this incurs an increase in cost as previously described.

Therefore, as the next best thing, it is possible to consider providing each of the light beams with a phase difference as close to 90° as possible.

Accordingly, by providing the wave plate 23, the usability of light of the emitted and returning beams is increased for the polarization hologram 4, while light-emission noise caused to the semiconductor chip 1 by the returning beam thereto can be reduced with respect to the non-polarization hologram 5 by greatly differentiating the direction of polarization of the returning beam from that of the emitted light beam.

Fifth Embodiment

Figure 12:
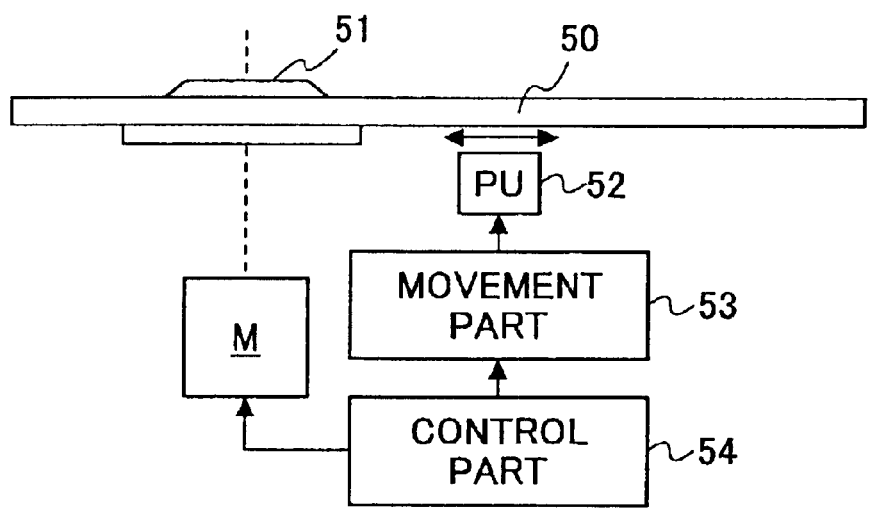
FIG. 12 is a diagram showing an optical disk drive unit according to a fifth embodiment of the present invention.

FIG. 12 is a diagram showing an optical disk drive unit according to a fifth embodiment of the present invention. The optical disk drive unit of the fifth embodiment, by using an optical pickup unit, performs at least one of information recording, reproduction, and erasure on a selected one of disk-type optical recording media of a plurality of types using different wavelengths. The optical disk drive unit includes a holding part 51, a motor M, an optical pickup unit 52, and a movement part 53. A selected one of optical recording media such as the above-described DVD-type and CD-type disks is set on the holding part 51 as an optical recording medium 50 The motor M rotates the optical recording medium 50 set on the holding part 51 as a driving part. The optical pickup unit 52 selects a light beam of a wavelength specific to the optical recording medium 50 so as to perform at least one of information recording, reproduction, and erasure The movement part 53 moves the optical pickup unit 52 in the radial directions of the optical pickup unit 50.

Any of the optical pickup units of the above-described embodiments may be used as the optical pickup unit 52. The optical disk drive unit further includes a control part 54 formed of a microcomputer and controlling each part of the optical, disk drive unit.

Each of the optical pickup units of the above-described embodiments includes the two semiconductor laser chips 1 and 3 in a single package, and each of the semiconductor laser chips 1 and 3 can be of a high-power type. Therefore, when any of the optical pickup units of the above-described embodiments is employed as the optical pickup unit 52, the optical disk drive unit of the fifth embodiment is realized as a downsized optical disk drive unit that can perform information recording on and information reproduction from both the DVD-type and CD-type of disks.

In recent years, rewritable optical disks have been usable in notebook computers, so that thinner optical pickup units with low power consumption are strongly needed. Each of the optical pickup units of the above-described embodiments is downsized by having the two semiconductor laser chips 1 and 3 in a single package. Further, each of the optical pickup units increases the usability of light by using the polarization hologram 4, thereby performing information recording and reproduction with a small driving current.

Furthermore, each of the optical pickup units has the non-polarization detection system for a disk whose substrate has high birefringence. Therefore, each of the optical pickup units can perform stable information reproduction. By using any of the optical pickup units of the present invention, an optical disk drive unit suitable for carrying around or to use as long as possible with limited power of a battery, such as a portable external drive or a drive unit housed in a notebook computer, is realized.

In the above-described embodiments, the light beams of the two wavelengths of approximately 660 and 780 nm are used. However, the present invention is not limited to these two wavelengths, and a variety of combinations of wavelengths, such as the combination of 405 and 660 nm wavelengths and the combination of 405 and 780 nm wavelengths, may be used in the present invention.

According to the present invention, an optical pickup unit employs holograms designed for respective wavelengths to correct the detection condition of a returning beam although a plurality of semiconductor laser chips are individually mounted so that the light-emitting parts thereof are positioned with less accuracy. Therefore, the optical pickup unit of the present invention can obtain accuracy in detecting the returning beam with ease compared with a conventional optical pickup unit using a single hologram.

According to the present invention, desired semiconductor laser chips can be selected and used in accordance with the specifications of the optical pickup unit. Therefore, the semiconductor laser chips can be optimized suitably for an optical disk drive unit. Accordingly, the optical disk drive unit can be produced at lower cost than a conventional optical disk drive unit using the low-yield two-wavelength monolithic chip.

Further, according to the present invention, signal detection can be performed with a non-polarization characteristic for a specific -wavelength. Therefore, stable information reproduction can be performed with no variation caused by the birefringence of a disk substrate in a detection signal. Further, information recording and reproduction with high efficiency can be realized for a wavelength requiring recording and reproduction with high efficiency by the polarization detection system.

Accordingly, the optical disk drive unit of the present invention can be realized at low cost as an apparatus smaller in size and excellent in power saving by using any of the optical pickup units of the present invention.

Sixth Embodiment

Figure 13:
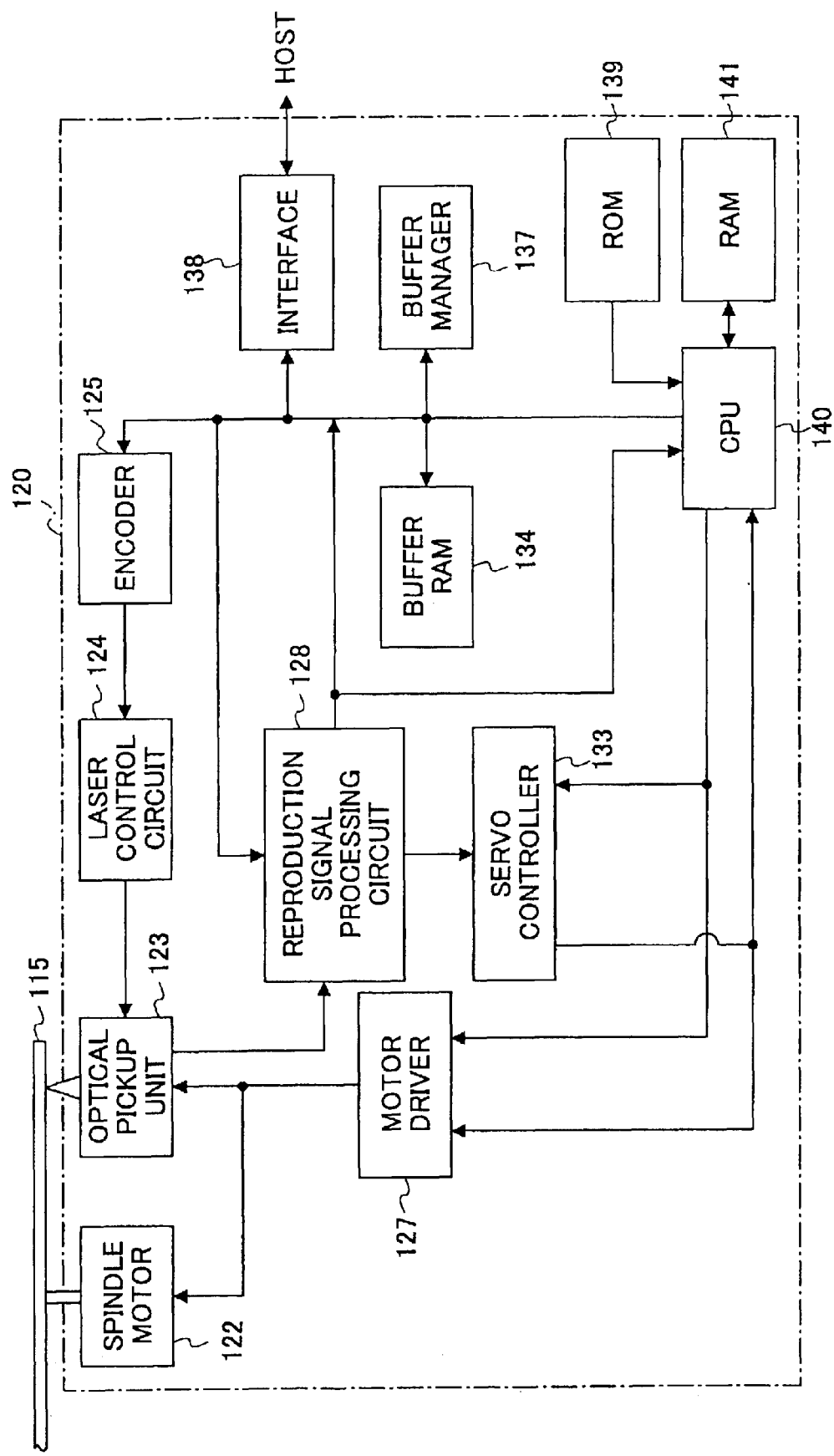
FIG. 13 is a block diagram showing an optical disk unit according to a sixth embodiment of the present invention.

FIG. 13 is a block diagram showing a structure of an optical disk unit 20 including an optical pickup unit 123 according to a six embodiment of the present invention.

The optical disk unit 20 includes a spindle motor 122, the optical pickup unit 123, a laser control circuit 124, an encoder 125, a motor driver 127, a reproduction signal processing circuit 128, a servo controller 133, a buffer RAM 134, a buffer manager 137, an interface 138, a ROM 139, a CPU 140, and a RAM 141. In FIG. 13, the arrows do not show all connections among the blocks, but only indicate the typical flows of signals and information.

Figure 14:
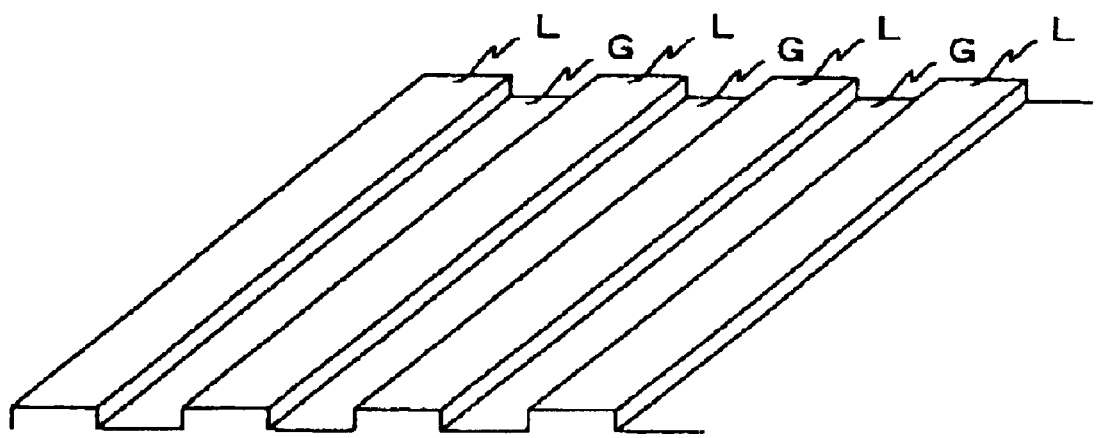
FIG. 14 is a diagram for illustrating a track configuration of an optical disk according to the sixth embodiment of the present invention.

The optical pickup unit 123 focuses a laser beam onto the recording surface of an optical disk (information recording medium) 115. A spiral track or concentric tracks are formed on the recording surface of the optical disk 115. The optical pickup unit 123 also receives a reflected light from the recording medium. As shown in FIG. 14, each track is divided into two parts in the direction perpendicular to the tangential direction of the track, and is formed of a land L serving as a data track and a groove G serving as a guide track. The distance between the centers of each adjacent lands or grooves in the tracking directions is called a track pitch. A description will be given later of the configuration of the optical pickup unit 123.

Referring back to FIG. 13, the reproduction signal processing circuit 128 converts a current signal that is the output signal of the optical pickup unit 123 to a voltage signal, and detects a wobble signal, a reproduction signal, and servo signals (focus error and tracking error signals) based on the voltage signal. Further, the reproduction signal processing circuit 128 extracts address information and a synchronization signal, and outputs the address information to the CPU 140 and the synchronization signal to the encoder 125. Further, the reproduction signal processing circuit 128 performs error correction on the reproduction signal, which is, thereafter, stored in the buffer RAM 134 via the buffer manager 137. The reproduction signal processing circuit 128 outputs servo signals to the servo controller 133.

The servo controller 133 generates control signals controlling the optical pickup unit 123 based on the servo signals, and outputs the control signals to the motor driver 127.

The buffer manager 137 manages data input to and data output from the buffer RAM 134, and notifies the CPU 140 when the amount of data stored in the buffer RAM 134 reaches a predetermined value.

The motor driver 127 controls the optical pickup unit 123 and the spindle motor 122 based on the control signals supplied from the servo controller 133 and instructions supplied from the CPU 140.

The encoder 125 extracts the data stored in the buffer RAM 134 through the buffer manager 137 based on an instruction supplied from the CPU 140, and creates data to be written (writing data) to the optical disk 115 by adding error-correcting codes to the extracted data. Then, the encoder 125, based on an instruction supplied from the CPU 140, outputs the writing data to the laser control circuit 124 in synchronism with the synchronization signal supplied from the reproduction signal processing circuit 128.

The laser control circuit 124 controls the laser output of the optical pickup unit 123 based on the writing data supplied from the encoder 125. The laser control circuit 124 controls one of the two light sources of the optical pickup unit, which will be described later, based on an instruction supplied from the CPU 140.

The interface 138 is a two-way communication interface with a host such as a personal computer, and is based on a standard interface such as ATAPI (AT Attachment Packet Interface) or SCSI (Small Computer System Interface).

The ROM 139 stores a program written in a code decodable by the CPU 140.

The CPU 140 controls the operations of the above-described parts based on the program stored in the ROM 139, and temporarily stores data required to control the operations in the RAM 141.

Next, a description will be given, with reference to FIGS. 15A through 16B, of the configuration of the optical pickup unit 123.

Figure 15A:
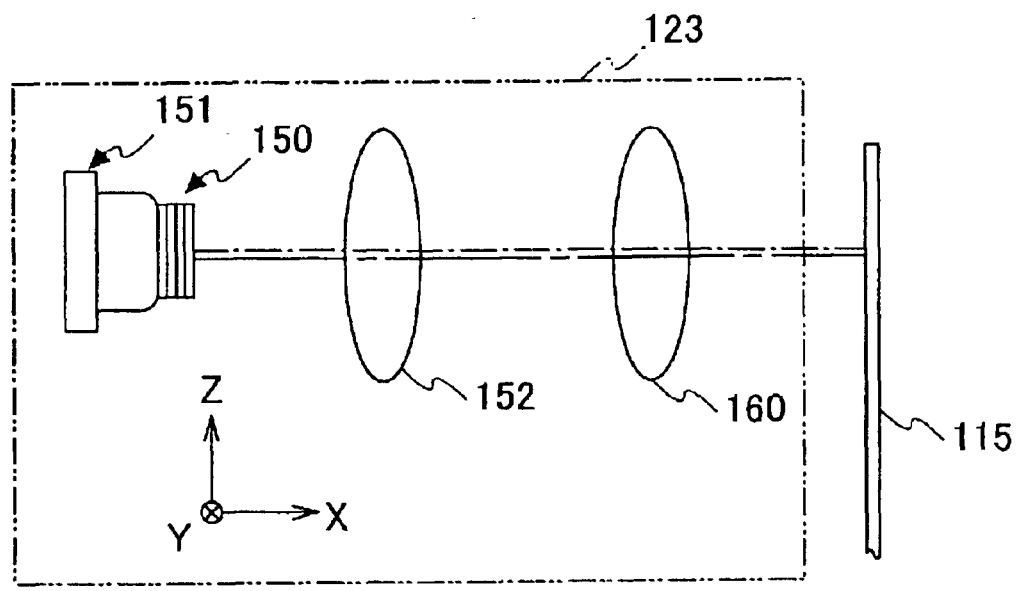
FIG. 15A is a schematic diagram showing an optical system of an optical pickup unit of the optical disk unit of FIG. 13.

As shown in FIG. 15A, the optical pickup unit 123 includes a light-emitting and light-receiving module 151, a hologram unit 150, a collimator lens 152, an objective lens 160, and a driving system formed of a focusing actuator, a tracking actuator, and a seek motor (not shown in the drawing). The light-emitting and light-receiving module 151 selectively emits one of laser beams of 650 nm and 780 nm wavelengths and receives a returning beam reflected back from the recording surface of the optical disk 115. The hologram unit 150 divides the light beam emitted from the light-emitting and light-receiving module 151 into a plurality of beams and diffracts the returning beam from the optical disk 15 in a predetermined direction.

Figure 15B:
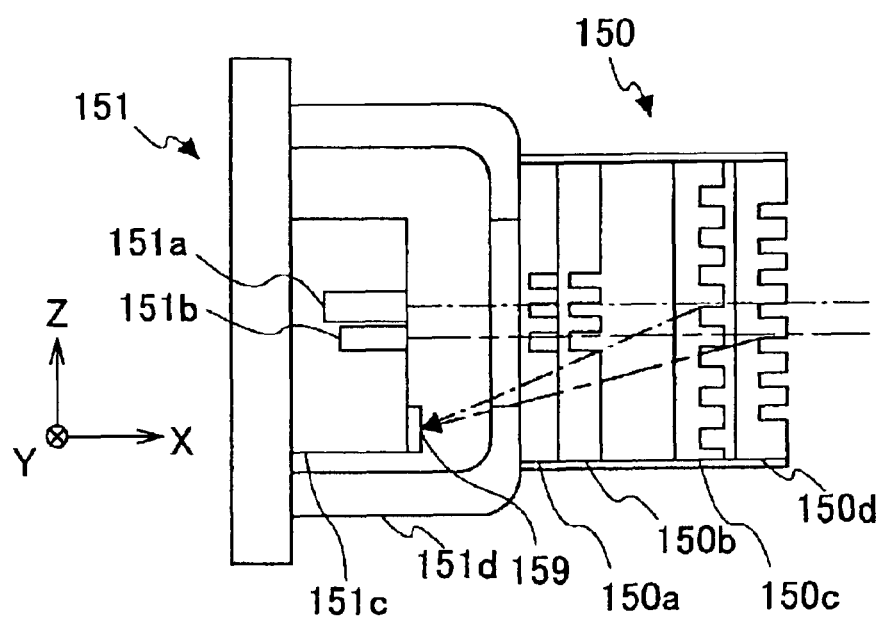
FIG. 15B is a diagram showing a detailed configuration of each of a light-emitting and light-receiving module and a hologram unit of the optical pickup unit of FIG. 15A.

As shown in FIG. 15B, the light-emitting and light-receiving module 151 includes a first semiconductor laser 151a emitting the laser beam of 650 nm wavelength, a second semiconductor laser 151b emitting the laser beam of 780 nm wavelength, a light receiver 159 as a photodetector receiving the returning beam, a stem 151c holding the semiconductor lasers 151a and 151b and the light receiver 159, and a cover 151d protecting the semiconductor lasers 151a and 151b and the light receiver 159. The light-emitting and light-receiving module 151 further includes an opening through which the light beam is emitted outside from each of the semiconductor lasers 151a and 151b and the returning beam enters the light-emitting and light-receiving module 151. Hereinafter, this opening is referred to as an "emission window." The first semiconductor laser 151a is selected when the optical disk 115 is a DVD disk, and the second semiconductor laser 151b is selected when the optical disk 115 is a CD disk.

As shown in FIG. 15B, the hologram unit 150 includes first and second grating elements 150a and 150b and first and second holograms 150c and 150d. Of the two grating elements 150a and 150b, the first grating element 150a is provided on the light-source side, and of the two holograms 150c and 150d, the first hologram 150c is provided on the light-source side.

The first grating element 150a divides the 650 nm light beam emitted from the first semiconductor laser 151a of the light-emitting and light-receiving module 151 (hereinafter also referred to as a "650 nm emitted light beam" for convenience of description) into a $0^{th}$-order diffracted light and $\pm 1^{st}$-order diffracted lights. The second grating element 150b divides the 780 nm light beam emitted from the second semiconductor laser 151b of the light-emitting and light-receiving module 151 (hereinafter also referred to as a "780 nm emitted light beam" for convenience of description) into a $0^{th}$-order diffracted light and $\pm 1^{st}$-order diffracted lights. In this embodiment, the first and second grating elements 150a and 150b are integrated with each other with an alignment accuracy of $\pm 0.01°$.

Figure 16A:
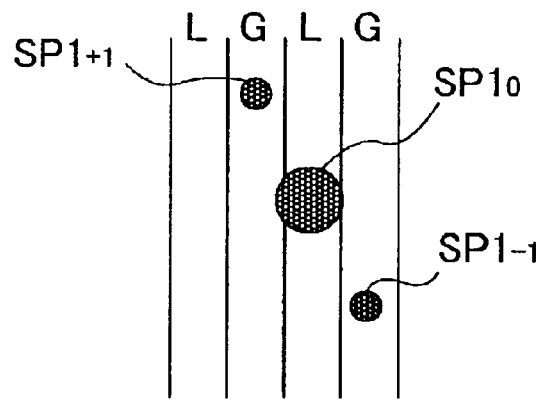
FIG. 16A is a diagram for illustrating positions on which $0^{th}$-order and $\pm 1^{st}$-order diffracted light beams are focused on the recording surface of a DVD disk and FIG. 16B is a diagram for illustrating positions on which $0^{th}$-order and $\pm 1^{st}$-order diffracted light beams are focused on the recording surface of a CD disk according to the sixth embodiment of the present invention.

The first grating element 150a has a diffraction grating formed thereon so that when the beam spot of the $0^{th}$-order diffracted light (hereinafter referred to as a "$0^{th}$-order beam spot $SP1_0$") is formed on a land L of the recording surface of the optical disk (DVD disk) 115, the beam spot of the $+1^{st}$-order diffracted light (hereinafter referred to as a "$+1^{st}$-order beam spot $SP1_{+1}$") and the beam spot of the $-1^{st}$-order diffracted light (hereinafter referred to as a "$-1^{st}$-order beam spot $SP1_{-1}$") are formed at respective positions spaced a half track pitch apart in the tracking directions from the center of the land L on which the $0^{th}$-order beam spot $SP1_0$ is formed as shown in FIG. 16A.

Figure 16B:
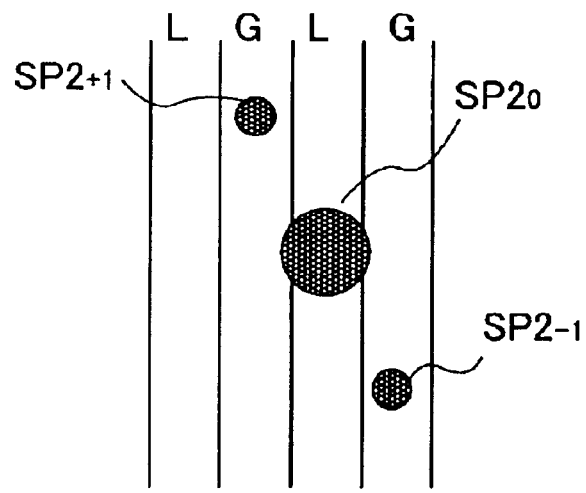

The second grating element 150b has a diffraction grating formed thereon so that when the beam spot of the $0^{th}$-order diffracted light (hereinafter referred to as a "$0^{th}$-order beam spot $SP2_0$") is formed on a land L of the recording surface of the optical disk (CD disk) 115, the beam spot of the $+1^{st}$-order diffracted light (hereinafter referred to as a "$+1^{st}$-order beam spot $SP2_{+1}$") and the beam spot of the $-1^{st}$-order diffracted light (hereinafter referred to as a "$-1^{st}$-order beam spot $SP2_{-1}$") are formed at respective positions spaced a half track pitch apart in the tracking directions from the center of the land L on which the $0^{th}$-order beam spot $SP2_0$ is formed as shown in FIG. 16B.

The first hologram 150c diffracts the returning beam of 650 nm wavelength reflected back from the recording surface of the optical disk 115 (hereinafter also referred to as a "650 nm returning beam") toward the light-receiving surface of the light receiver 159. The second hologram 150d diffracts the returning beam of 780 nm wavelength reflected back from the recording surface of the optical disk 115 (hereinafter also referred to as a "780 nm returning beam") toward the light-receiving surface of the light receiver 159. In this embodiment, the first and second holograms 150c and 150d are integrated with each other in consideration of the deviation between their respective light-emitting points (for instance, approximately 50 to 300 μm)

Figure 17A:
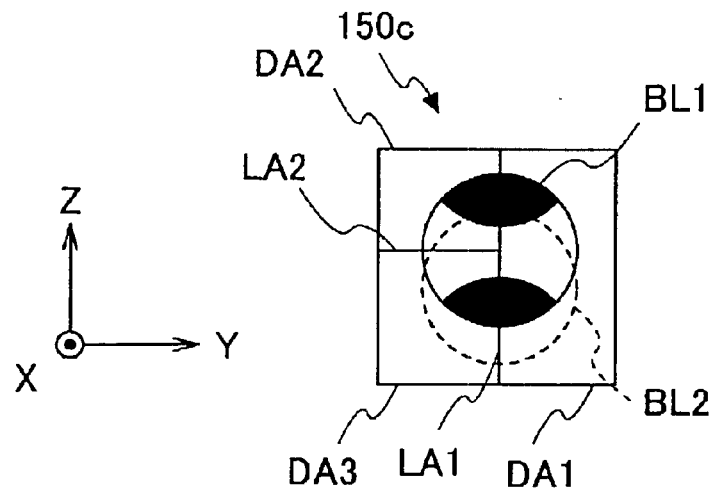
FIG. 17A is a diagram for illustrating a first hologram of the optical pickup unit for diffracting a 650 nm returning beam and FIG. 17B is a second hologram of the optical pickup unit for diffracting a 780 nm returning beam according to the sixth embodiment of the present invention.

As shown in FIG. 17A, the first hologram 150c is divided into two regions by the dividing line LA1 in the directions (along the Z-axis) corresponding to the tracking directions of the objective lens 160, and the region on the −Y side of the dividing line LA1 is further divided into two regions DA2 and DA3 by the dividing line LA2 along the Y-axis. The region on the +Y side of the dividing line LA1 is referred to as DA1. That is, the first hologram 150c is formed of the three regions DA1 through DA3. The dividing line LA2 is positioned so that the crossing point of the dividing lines LA1 and LA2 substantially coincides with the optical axis of the 650 nm returning beam BL1

Figure 17B:
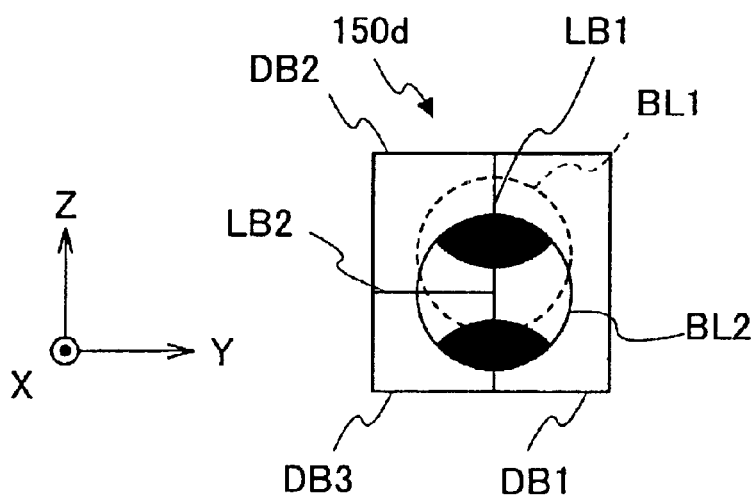

As shown in FIG. 17B, the second hologram 150d is divided into two regions by the dividing line LB1 in the directions (along the Z-axis) corresponding to the tracking directions of the objective lens 160, and the region on the −Y side of the dividing line LB1 is further divided into two regions DB2 and DB3 by the dividing line LB2 along the Y-axis. The region on the +Y side of the dividing line LB1 is referred to as DB1. That is, the second hologram 150d is formed of the three regions DB1 through DB3. The dividing line LB2 is positioned so that the crossing point of the dividing lines LB1 and LB2 substantially coincides with the optical axis of the 780 nm returning beam BL2.

The first and second holograms 150c and 150d are positioned to be spaced approximately 1.5 through 2.0 mm apart from the first and second grating elements 150a and 150b so that the diffracted lights from the first and second holograms 150c and 150d may not be diffracted by the first and second grating elements 150a and 150b.

Figure 18:
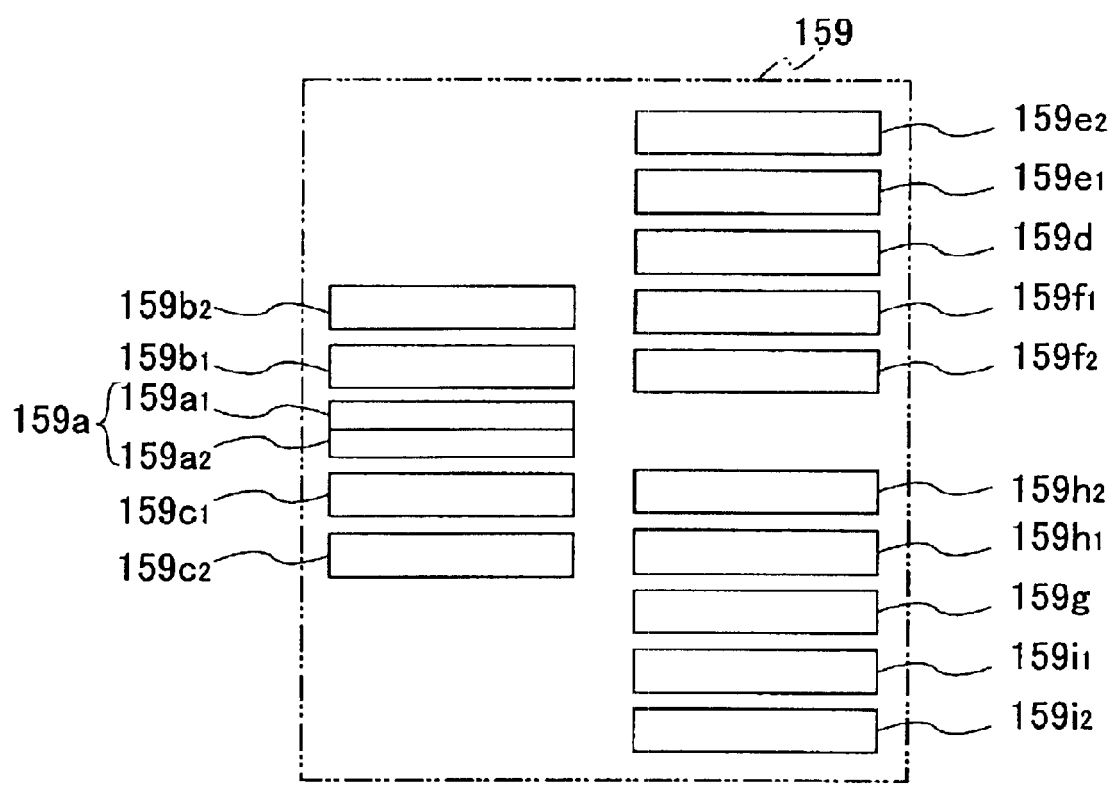
FIG. 18 is a diagram for illustrating light-receiving elements of a light receiver of the optical pickup unit according to the sixth embodiment of the present invention.
Figure 19A:
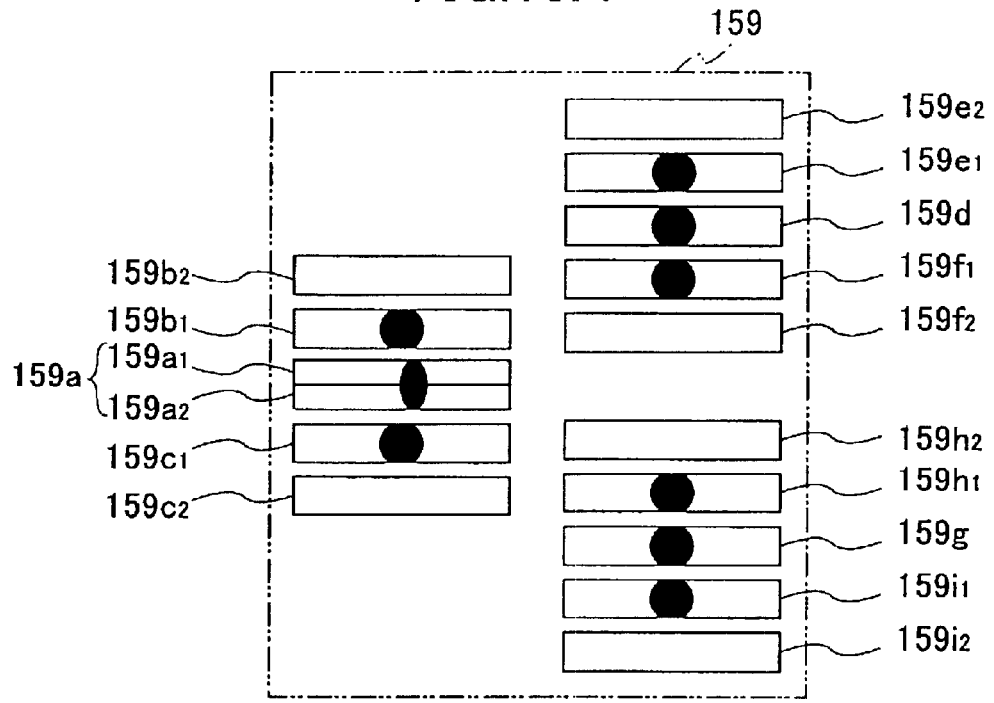
FIG. 19A is a diagram for illustrating positions at which the 650 nm returning beam is received on the light receiver and FIG. 19B is a diagram for illustrating positions at which the 780 nm returning beam is received on the light receiver according to the sixth embodiment of the present invention.
Figure 19B:
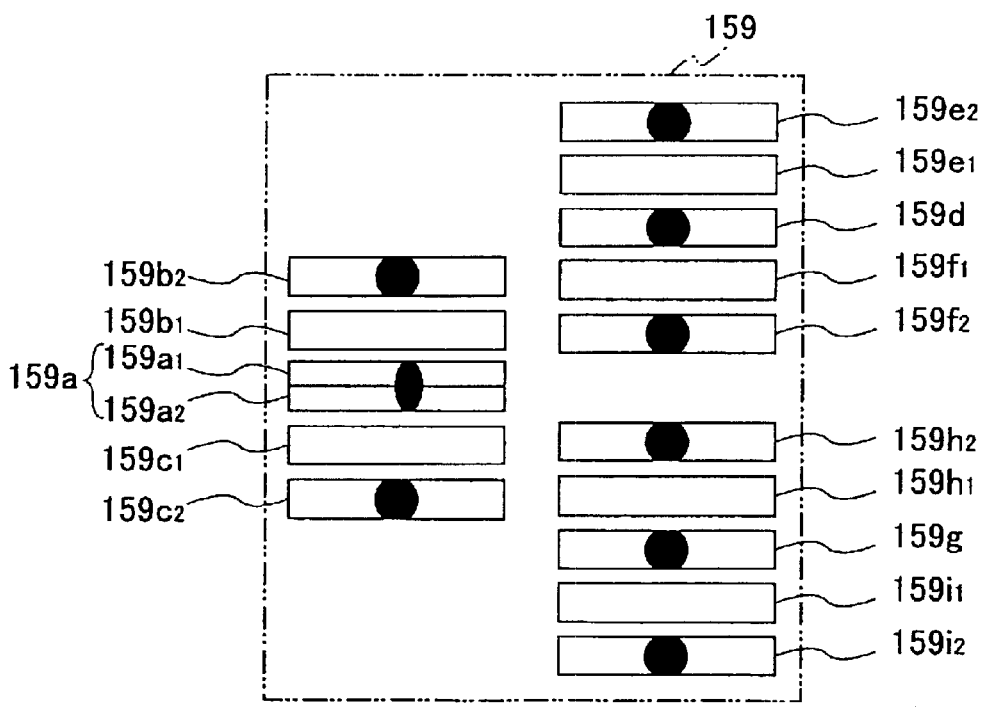

As shown in FIG. 18, the light receiver 159 includes a light-receiving element 159a divided into two light-receiving element parts $159a_1$ and $159a_2$ and fourteen light-receiving elements $159b_1$, $159b_2$, $159c_1$, $159c_2$, $159d$, $159e_1$, $159e_2$, $159f_1$, $159f_2$, $159g$, $159h_1$, $159h_2$, $159i_1$, and $159i_2$. The light-receiving elements 159a, 159d, and 159g receive the $0^{th}$-order diffracted light included in each of the 650 nm and 780 nm returning beams. As shown in FIG. 19A, the light-receiving elements $159b_1$, $159e_1$, and $159h_1$ receive the $+1^{st}$-order diffracted light included in the 650 nm returning beam, and the light-receiving elements $159c_1$, $159f_1$, and $159i_1$ receive the $-1^{st}$-order diffracted light included in the 650 nm returning beam. Further, as shown in FIG. 19B, the light-receiving elements $159b_2$, $159e_2$, and $159h_2$ receive the $+1^{st}$-order diffracted light included in the 780 nm returning beam, and the light-receiving elements $159c_2$, $159f_2$, and $159i_2$ receive the $-1^{st}$-order diffracted light included in the 780 nm returning beam.

That is, the diffracted light from the region DA1 of the first hologram 150c is received on the dividing line of the light receiving element 159a and by the light-receiving elements $159b_1$ and $159c_1$. The diffracted light from the region DA2 is received by the light-receiving elements $159d$, $159e_1$ and $159f_1$. The diffracted light from the region DA3 is received by the light-receiving elements $159g$, $159h_1$ and $159i_1$.

The diffracted light from the region DB1 of the second hologram 150d is received on the dividing line of the light receiving element 159a and by the light-receiving elements $159b_2$ and $159c_2$. The diffracted light from the region DB2 is received by the light-receiving elements $159d$, $159e_2$ and $159f_2$. The diffracted light from the region DB3 is received by the light-receiving elements $159g$, $159h_2$ and $159i_2$.

A description will be given of the operation of the optical pickup unit 123 having the above-described configuration. First, a description will be given of the case where the optical disk 115 is a DVD disk.

A 650 nm light beam emitted from the first semiconductor laser 151a is divided into $0^{th}$-order and $\pm 1^{st}$-order diffracted lights by the first grating element 150a. The $0^{th}$-order and $\pm 1^{st}$-order diffracted lights passing through the second grating element 150b and the first and second holograms 150c and 150d are collimated into substantially parallel beams, and thereafter, are focused into respective small spots on the recording surface of the optical disk 115 by the objective lens 160.

The reflected lights or the returning beam from the recording surface of the optical disk 115 is collimated again into a substantially parallel beam, and passes through the collimator lens 152 to be incident on the hologram unit 150. The returning beam incident on the hologram unit 150 passes through the second hologram 150d and is diffracted by the first hologram 150c to be received by the light receiver 159. Each of the light-receiving elements forming the light receiver 159 outputs an electric current (current signal) corresponding to its received amount of light to the reproduction signal processing circuit 128. The output signals of the light-receiving elements of the light receiver 159 may be referred to collectively as the output signal of the light receiver 159.

Next, a description will be given of the case where the optical disk 15 is a CD disk. A 780 nm light beam emitted from the second semiconductor laser 151b passes through the first grating element 150a to be divided into $0^{th}$-order and $\pm 1^{st}$-order diffracted lights by the second grating element 150b. The $0^{th}$-order and $\pm 1^{st}$-order diffracted lights passing through the first and second holograms 150c and 150d are collimated into substantially parallel beams, and thereafter, are focused into respective small spots on the recording surface of the optical disk 115 by the objective lens 160.

The reflected lights or the returning beam from the recording surface of the optical disk 115 is collimated again into a substantially parallel beam, and passes through the collimator lens 152 to be incident on the hologram unit 150. The returning beam incident on the hologram unit 150 is diffracted by the second hologram 150d and passes through the first hologram 150c to be received by the light receiver 159. Each of the light-receiving elements forming the light receiver 159 outputs an electric current (current signal) corresponding to its received amount of light to the reproduction signal processing circuit 128.

Next, a description will be given of the operation, performed in the reproduction signal processing circuit 128, of detecting the servo signals and the reproduction signal based on the output signal of the optical pickup unit 123 having the above-described structure. The output signal of the optical pickup unit 123 has been subjected to predetermined current-to-voltage conversion in the reproduction signal processing circuit 128.

In the Case of DVD

The push-pull signal $PP_{11}$ of the $+1^{st}$-order diffracted light is obtained based on the following equation (1):

$$PP_{11} = Se_1 - Sh_1 \tag{1}$$

where $Se_1$ is a signal supplied from the light-receiving element $159e_1$, and $Sh_1$ is a signal supplied from the light-receiving element $159h_1$.

The push-pull signal $PP_{12}$ of the $-1^{st}$-order diffracted light is obtained based on the following equation (2):

$$PP_{12} = Sf_1 - Si_1 \tag{2}$$

where $Sf_1$ is a signal supplied from the light-receiving element $159f_1$, and $Si_1$ is a signal supplied from the light-receiving element $159i_1$.

Then, a summation signal $PP_1$ that is the sum of the push-pull signals $PP_{11}$ and $PP_{12}$ is obtained based on the following equation (3):

$$PP_1 = PP_{11} + PP_{12} \tag{3}$$

The push-pull signal $PP_{10}$ of the $0^{th}$-order diffracted light is obtained based on the following equation (4):

$$PP_{10} = Sd - Sg \tag{4}$$

where Sd is a signal supplied from the light-receiving element 159d, and Sg is a signal supplied from the light-receiving element 159g.

Then, after adjusting the level of the summation signal $PP_1$, a tracking error signal TE is obtained based on the following equation (5). That is, the tracking error signal TE is detected by the differential push-pull method:

$$TE = PP_{10} - PP_1 \tag{5}$$

A lens position signal RP indicating a shift (amount) of the objective lens 160 from its reference position is obtained based on the following equation (6):

$$RP = PP_{10} + PP_1 \tag{6}$$

Further, a track cross signal TC is obtained based on the following equation (7). The track cross signal TC is used to correct an RF signal when the optical disk 115 has a great difference in reflectivity between a recorded part and a non-recorded part as in a CD-R or DVD-R disk:

$$TC = (Sd + Sg) - (Se_1 + Sf_1 + Sh_1 + Si_1) \tag{7}$$

A reproduction signal RF is obtained based on the following equation (8):

$$RF = Sa_1 + Sa_2 + Sd + Sg \tag{8}$$

where $Sa_1$ is a signal supplied from the light-receiving element part $159a_1$, and $Sa_2$ is a signal supplied from the light-receiving element part $159a_2$.

Then, a focus error signal FE is obtained based on the following equation (9). That is, the focus error signal FE is detected by a so-called knife-edge method:

$$FE = Sa_1 - Sa_2 \tag{9}$$

In the Case of CD

The push-pull signal $PP_{21}$ of the $+1^{st}$-order diffracted light is obtained based on the following equation (10):

$$PP_{21} = Se_2 - Sh_2 \tag{10}$$

where $Se_2$ is a signal supplied from the light-receiving element $159e_2$, and $Sh_2$ is a signal supplied from the light-receiving element $159h_2$.

The push-pull signal $PP_{22}$ of the $-1^{st}$-order diffracted light is obtained based on the following equation (11):

$$PP_{22} = Sf_2 - Si_2 \tag{11}$$

where $Sf_2$ is a signal supplied from the light-receiving element $159f_2$, and $Si_2$ is a signal supplied from the light-receiving element $159i_2$.

Then, a summation signal $PP_2$ that is the sum of the push-pull signals $PP_{21}$ and $PP_{22}$ is obtained based on the following equation (12):

$$PP_2 = PP_{21} + PP_{22} \tag{12}$$

The push-pull signal $PP_{20}$ of the $0^{th}$-order diffracted light is obtained based on the following equation (13):

$$PP_{20} = Sd - Sg \tag{13}$$

Then, after adjusting the level of the summation signal $PP_2$, the tracking error signal TE is obtained based on the following equation (14). That is, the tracking error signal TE is detected by the differential push-pull method as in the case of the DVD disk:

$$TE = PP_{20} - PP_2 \tag{14}$$

The lens position signal RP indicating a shift (amount) of the objective lens 160 from its reference position is obtained based on the following equation (15):

$$RP = PP_{20} + PP_2 \tag{15}$$

Further, the track cross signal TC is obtained based on the following equation (16):

$$TC = (Sd + Sg) - (Se_2 + Sf_2 + Sh_2 + Si_2) \tag{16}$$

The reproduction signal RF is obtained based on the following equation (17):

$$RF = Sa_1 + Sa_2 + Sd + Sg \tag{17}$$

Then, the focus error signal FE is obtained based on the above-described equation (9).

Whether the optical disk 115 is a CD or DVD disk can be determined from the intensity of light reflected back from the recording surface of the optical disk 115. Normally, this determination is performed when the optical disk 115 is inserted into a predetermined position in the optical disk unit 120. Further, the type of the optical disk 115 can be determined based on TOC (Table Of Contents) information, PMA (Program Memory Area) information, and the wobble signal prerecorded on the optical disk 115. The laser control circuit 124 is notified of the result of the determination to select one of the first and second semiconductor lasers 151a and 151b based on the result of the determination.

Next, a brief description will be given of the operation of recording data on the optical disk 115 by using the optical disk unit 120. In the following description, one of the first and second semiconductor lasers 151*a* and 151*b* has been selected in the above-described manner.

When the CPU 140 receives a recording request from the host, the CPU 140 outputs to the motor driver 127 a control signal for controlling the rotation of the spindle motor 122 based on a recording rate. The CPU 140 also notifies the reproduction signal processing circuit 128 of the reception of the recording request from the host. When the rotation of the optical disk 115 reaches a predetermined linear velocity, the reproduction signal processing circuit 128 obtains the address information based on the output signal of the optical pickup unit 123, and notifies the CPU 140 of the address information.

Further, the reproduction signal processing circuit 128 detects the tracking error signal TE and the focus error signal FE based on the output signal of the optical pickup unit 123 as described above, and outputs the tracking error signal TE and the focus error signal FE to the servo controller 133. The servo controller 133, based on the tracking error signal TE and the focus error signal FE supplied from the reproduction signal processing circuit 128, drives the tracking actuator and the focusing actuator of the optical pickup unit 123 through the motor driver 127. That is, a tracking error and a focus error are corrected.

The CPU 140 stores data supplied from the host in the buffer RAM 134 through the buffer manager 137. When the amount of data stored in the buffer RAM 134 exceeds the predetermined value, the buffer manager 137 notifies the CPU 140.

When the CPU 140 is notified by the buffer manager 137, the CPU 140 instructs the encoder 125 to create writing data. Further, based on the address information supplied from the reproduction signal processing circuit 128, the CPU 140 outputs to the motor driver 127 a signal commanding the seek operation of the optical pickup unit 123 such that the optical pickup unit 123 is positioned at a given writing starting point. The reproduction signal processing circuit 128 detects the above-described lens position signal RP based on the output signal of the optical pickup unit 123, and outputs the lens position signal RP to the servo controller 133. In order to hold the objective lens 160 to its reference position during the seek operation, the servo controller 133 controls the tracking actuator through the motor driver 127 based on the lens position signal RP supplied from the reproduction signal processing circuit 128.

When the CPU 140 determines, based on the address information supplied from the reproduction signal processing circuit 128, that the optical pickup unit 123 is positioned at the predetermined writing starting position, the CPU 140 notifies the encoder 125. Then, the encoder 125 records the writing data on the optical disk 115 through the laser control circuit 124 and the optical pickup unit 123.

Next, a brief description will be given of the operation of reproducing recorded data from the optical disk 115 by using the optical disk unit 120. In the following description, one of the first and second semiconductor lasers 151*a* and 151*b* has been selected in the above-described manner.

When the CPU 140 receives a reproduction request from the host, the CPU 140 outputs to the motor driver 127 a control signal for controlling the rotation of the spindle motor 122 based on a reproduction rate. The CPU 140 also notifies the reproduction signal processing circuit 128 of the reception of the reproduction request from the host. When the rotation of the optical disk 115 reaches a predetermined linear velocity, the reproduction signal processing circuit 128 obtains the address information based on the output signal of the optical pickup unit 123, and notifies the CPU 140 of the address information.

Further, as in the above-described case of recording, a tracking error and a focus error, are corrected.

Based on the address information supplied from the reproduction signal processing circuit 128, the CPU 140 outputs to the motor driver 127 a signal commanding the seek operation of the optical pickup unit 123 such that the optical pickup unit 123 is positioned at a given reading starting point. Then, as in the above-described case of recording, the objective lens is held to its reference position during the seek operation.

The CPU 140 determines, based on the address information supplied from the reproduction signal processing circuit 128, whether the optical pickup unit 123 is positioned at the predetermined reading starting point. If it is determined that the optical pickup unit 123 is positioned at the predetermined reading starting point, the CPU 140 notifies the reproduction signal processing circuit 128. Then, the reproduction signal processing circuit 128 detects the reproduction signal RF as described above while correcting the output signal of the optical pickup unit 123 based on the above-described track cross signal TC. After being subjected to error correction in the, reproduction signal processing circuit 128, the reproduction signal RF is stored in the buffer RAM 134.

When the data stored in the buffer RAM 134 is complete as sector data, the buffer manager 137 transfers the stored data to the host via the interface 138.

In the optical disk unit 120, the signal processing circuit 128 detects the focus error signal FE and the tracking error signal TE based on the output signal of the optical pickup unit 123 and corrects a focus error and a tracking error through the servo controller 133 and the motor driver 127 at any time until the end of the recording or reproduction operation as described above. Further, based on the lens position signal RP supplied from the reproduction signal processing circuit 128, the CPU 140 instructs the servo controller 133 to drive the seek motor and return the objective lens 160 to its reference position when the shift of the objective lens 160 exceeds a predetermined value.

As is apparent from the above description, in the optical disk unit 120 of this embodiment, the reproduction signal processing circuit 128 and the CPU 140 form a processing apparatus.

However, the present invention is not limited to this configuration. That is, at least part of the components of the above-described configuration realized by the operation of the CPU 140 in accordance with the program may be realized by hardware, or all of the components may be realized by hardware.

As described above, the optical pickup unit 123 of this embodiment includes the first grating element 150*a* dividing the 650 nm emitted light beam, the second grating element 150*b* dividing the 780 nm emitted light beam, the first hologram 150*c* guiding the 650 nm returning beam to the light receiver 159, and the second hologram 150*d* guiding the 780 nm returning beam to the light receiver 159. Thereby, the first grating element 150*a* and the first hologram 150*c* can be optimized for the light beam emitted from the DVD light source, and the second grating element 150*b* and the second hologram 150*d* can be optimized for the light beam emitted from the CD light source. That is, even when the light-emitting points of the DVD and CD light sources are different, the light receiver 159 stably outputs a signal suitable for the differential push-pull method. Therefore, according to the optical pickup unit 123 of this embodiment, tracking error information can be obtained with accuracy with respect to both DVDs and CDs.

Further, according to the optical pickup unit 123 of this embodiment, the first and second grating elements 150a and 150b are integrated with each other with the alignment accuracy of ±0.01°. Therefore, the second grating element 150b requires no adjustment. That is, by adjusting the first grating element 150a with an accuracy of ±0.2°, for instance, so that the 650 nm emitted light beam divided by the first grating element 150a can be focused on the positions shown in FIG. 16A, the 780 nm emitted light beam divided by the second grating element 150b with approximately the same accuracy can be focused on the positions shown in FIG. 16B. Accordingly, the number of adjustments can be reduced from two to one.

Further, in the optical pickup unit 123 of this embodiment, the first hologram 150c is provided on the light-source side and the second hologram 150d is provided on the objective-lens side. Thereby, the first hologram 150c for the shorter wavelength requiring high positioning accuracy is first positioned in incorporating the first and second holograms 150c and 150d. Therefore, the incorporation of the first hologram 150c can be performed in a larger work space, so that the incorporating operation can be performed with better efficiency. Further, the first and second holograms 150c and 150d are integrated with each other in the optical pickup unit 123 of this embodiment. Therefore, by adjusting the positions of the first and second holograms 150c and 150d relative to each other before their integration, the positions of the first and second holograms 150c and 150d can be adjusted more simply with respect to the returning beam and the light receiver 159 at the time of incorporating the first and second holograms 150c and 150d into the optical pickup unit 123.

Further, the optical pickup unit 123 of this embodiment employs the individual semiconductor lasers 151a and 151b as light sources of a plurality of wavelengths instead of using monolithically formed semiconductor lasers. Therefore, high-power semiconductor lasers can be employed. Thereby, the optical pickup unit 123 of this embodiment is suitable for high-speed recording.

Further, according to the optical pickup unit 123 of this embodiment, the individual semiconductor lasers 151a and 151b are packaged in the same housing. Therefore, the optical pickup unit 123 of this embodiment can be smaller in size. Further, each of the semiconductor lasers 151a and 151b is positioned with excellent accuracy when packaged. Therefore, the assembling and adjustment operations can be simplified. That is, further cost reduction can be realized.

Further, according to the optical pickup unit 123 of this embodiment, the light receiver 159 and the semiconductor lasers 151a and 151b are provided in the same housing. This allows the optical pickup unit 123 to be smaller in size. Further, since the light receiver 159 and the semiconductor lasers 151a and 151b are positioned with excellent accuracy when packaged, the assembling and adjustment operations can be simplified. That is, further cost reduction can be realized.

Further, according to the optical pickup unit 123 of this embodiment, the first and second grating elements 150a and 150b are integrated with the light-emitting and light-receiving module 151. Therefore, the optical pickup unit 123 can be smaller in size.

Further, according to the optical disk unit 120 of this embodiment, a tracking error signal can be detected with excellent accuracy based on the output signal of the optical pickup unit 123 with respect to each of the DVD disk and the CD disk. Therefore, the optical disk unit 120 can be used for both DVD and CD disks and can perform stable information recording and reproduction with accuracy. Further, the downsized optical pickup unit 123 also allows the optical disk unit 120 itself to be smaller in size with reduced power consumption. The optical disk unit 120 is easier to carry around and can be used for a longer period of time as a portable apparatus.

In this embodiment, the calculations of the above-described equations (1) through (17) are performed in the reproduction signal processing circuit 128. However, an operational circuit that performs at least one of the calculations of the equations (1) through (17) may be added to the optical pickup unit 123. Thereby, the reproduction signal processing circuit 128 can be simplified, and can be wired with simplicity when incorporated into the optical disk unit 120. Thus, the optical disk unit 120 can be assembled with increased efficiency at reduced cost. Particularly, by adding an operational circuit (detection part) that performs the calculations of the equations (1) through (5) and (10) through (14) to the optical pickup unit 123, the optical pickup unit 123 is allowed to detect the tracking error signal by the differential push-pull method. In this case, the detection part can eliminate an offset component resulting from a shift of the objective lens 160 to be included in the output signal of the light receiver 159. Therefore,the detection part can detect a position at which the emitted light beam is focused on the recording surface of the optical disk 115 with accuracy and stability.

Figure 20:
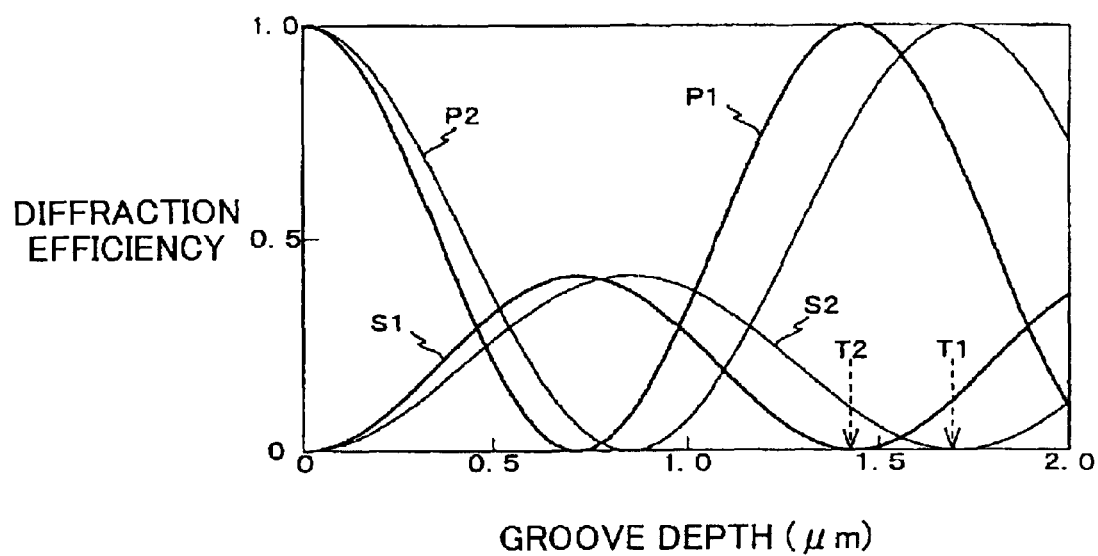
FIG. 20 is a diagram for illustrating the relationship between diffraction efficiency and groove depth in a diffractive optical element.

In the optical pickup unit 123 of this embodiment, each of the first and second grating elements 150a and 150b may have wavelength selectivity to selectively diffract a light beam of a predetermined wavelength. FIG. 20 is a diagram for illustrating the relationship between diffraction efficiency and groove depth in a diffractive optical element. As shown in FIG. 20, it is widely known that the diffraction efficiency of a diffractive optical element such as a grating element relates to the depth of the grooves of its diffraction grating. The curved lines P1 and S1 of FIG. 20 show the relationships in the case of the $0^{th}$-order diffracted light and the $1^{st}$-order diffracted light of the 650 nm incident light beam, respectively. The curved lines P2 and S2 of FIG. 20 show the relationships in the case of the $0^{th}$-order diffracted light and the $1^{st}$-order diffracted light of the 780 nm incident light beam, respectively.

FIG. 20 shows that the groove depth of the grating may be set to approximately 1.7 $\mu$m as indicated by T1 in the first grating element 150a, for instance, in order that the diffraction efficiency can be set to approximately 0% for the $1^{st}$-order diffracted light of the 780 nm light beam and to approximately 10% for the $1^{st}$-order diffracted light of the 650 nm light beam. FIG. 20 also shows that the groove depth of the grating may be set to approximately 1.4 $\mu$m as indicated by T2 in the second grating element 150a, for instance, in order that the diffraction efficiency can be set to approximately 0% for the $1^{st}$-order diffracted light of the 650 nm light beam and to approximately 10% for the $1^{st}$-order diffracted light of the 780 nm light beam. Thereby, generation of unnecessary diffracted light can be avoided in each of the first and second grating elements 150a and 150b, so that the usability of the light beam emitted from the light-emitting and light-receiving module 151 can be increased. Consequently, high-speed information recording and reproduction can be performed with stability. It is also possible that only one of the first and second grating elements 150a and 150b has wavelength selectivity.

The same thing applies to the first and second holograms 150c and 150d. That is, the groove depth may be set to approximately 1.7 μm in the first hologram 150c in order that the diffraction efficiency can be set to approximately 0% for the $1^{st}$-order diffracted light of the 780 nm light beam and to approximately 10% for the $1^{st}$-order diffracted light of the 650 nm light beam. The groove depth may be set to approximately 1.4 μm in the second hologram 150d in order that the diffraction efficiency can be set to approximately 0% for the $1^{st}$-order diffracted light of the 650 nm light beam and to approximately 10% for the $1^{st}$-order diffracted light of the 780 nm light beam. Thereby, generation of unnecessary diffracted light can be avoided, so that the usability of the returning beam can be increased. As a result, the signal level and the S/N ratio of the output signal of the light receiver 159 can be increased since the amount of light received by the light receiver 159 is increased. It is also possible that only one of the first and second holograms 150c and 150d has wavelength selectivity.

When the diffraction efficiency for the $1^{st}$-order diffracted light is maximized, the relationship between the wavelength λ of an incident light beam and the groove depth T is expressed by the following formula (18):

$$\Delta n \times T = \lambda/2 \tag{18}$$

where Δn is the difference in refractive index between the diffractive optical element and a substance filled in the grooves thereof. For instance, when a diffractive optical element having a refractive index of 1.5 is in air (whose refractive index is 1.0), Δn is 0.5 (=1.5−1.0), and T=0.65 μm if the wavelength of the incident light is 650 nm.

Figure 21A:
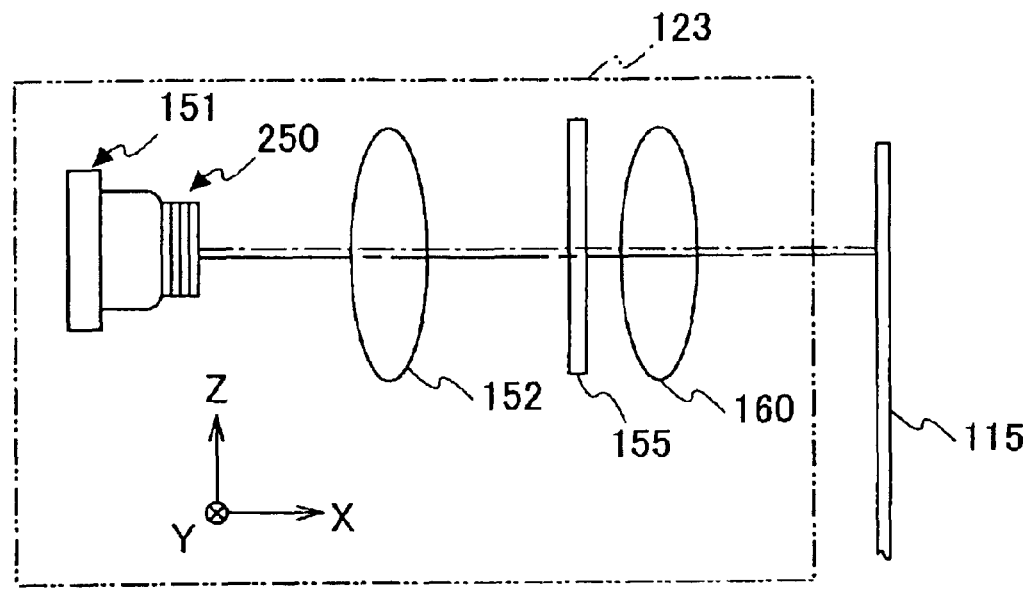
FIG. 21A is a diagram showing an optical system of the optical pickup unit employing polarization holograms and FIG. 21B is a diagram showing a detailed configuration of each of the light-emitting and light-receiving module and another hologram unit of FIG. 21A according to the sixth embodiment of the present invention.
Figure 21B:
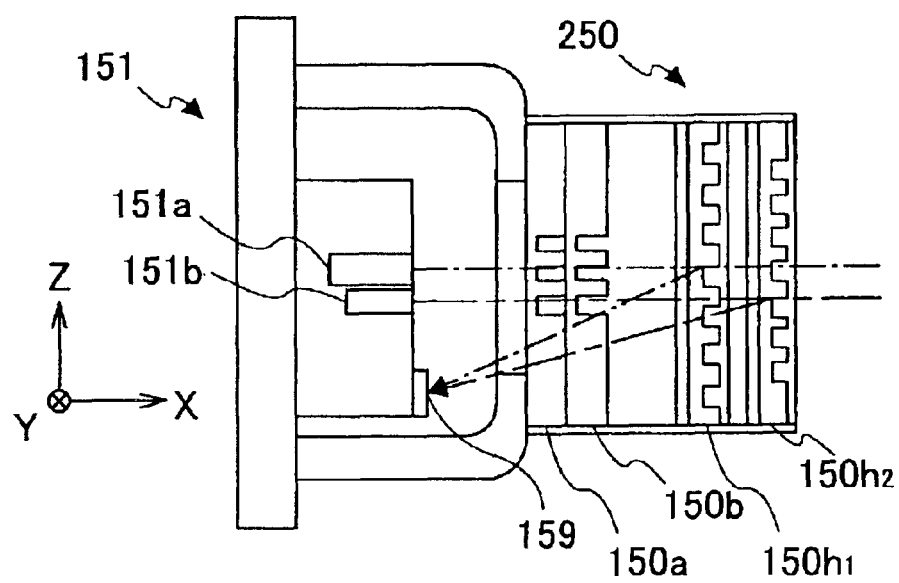

In this embodiment, each of the first and second holograms 150c and 150d of the hologram unit 150 is a non-polarization hologram. However, the hologram unit 150 may be replaced by a hologram unit 250 that replaces the first and second holograms 150c and 150d of the hologram unit 150 with first and second polarization holograms $150h_1$ and $150h_2$ as shown in FIG. 21B. The first polarization hologram $150h_1$, has the same hologram effect as the first hologram 150c and has a polarization characteristic that the diffraction efficiency depends of the direction of polarization of a light beam. The second polarization hologram $150h_2$ has the same hologram effect as the second hologram 150d and has a polarization characteristic that the diffraction efficiency depends of the direction of polarization of a light beam. In this case, as shown in FIG. 21A, for instance, a λ/4 plate 155 is provided between the collimator lens 152 and the objective lens 160 in the optical pickup unit 123 in order to provide a difference of 90° between the direction of polarization of the light beam emitted from each of the first and second semiconductor lasers 151a and 151b and the direction of polarization of the returning beam. The λ/4 plate 155 may be replaced by a phase difference film. Then, by setting each of the first and second polarization holograms $150h_1$ and $150h_2$ so that the diffraction efficiency is low for the direction of polarization of the light beam emitted from the light-emitting and light-receiving module 151 and is high for the direction of polarization of the returning beam, each of the first and second polarization holograms $150h_1$ and $150h_2$ transmits approximately 95% of the emitted light beam and diffracts approximately 35% of the returning beam, while a non-polarization hologram transmits approximately 80% of the emitted light beam and diffracts approximately 8% of the returning beam. Thereby, the light beam emitted from each of the first and second semiconductor lasers 151a and 151b is focused onto the recording surface of the optical disk 115 without substantially any loss of light. Therefore, high-speed information recording and reproduction can be performed with stability. Further, since the amount of light received by the light receiver 159 is increased, the signal level and the S/N ratio of the output signal of the light receiver 159 can be increased.

Here, a brief description will be given of the optical pickup unit 123 shown in FIGS. 21A and 21B in the case where the optical disk 115 is a DVD disk. A linearly polarized (for instance, p-polarized) light beam emitted from the first semiconductor laser 151a is divided into $0^{th}$-order and $±1^{st}$-order diffracted lights by the first grating element 150a. Then, the diffracted lights passing through the second grating element 150b and the first and second polarization holograms $150h_1$ and $150h_2$ are collimated to substantially parallel beams by the collimator lens 152, and are circularly polarized by the λ/4 plate 155 to be focused through the objective lens 160 into respective small spots on the recording surface of the optical disk 115.

Reflected lights or a returning beam from the recording surface of the optical disk 115 is circularly polarized in the direction reverse to that of the emitted light beam and is converted to a substantially parallel beam by the objective lens 160. Thereafter, the returning beam is converted by the λ/4 plate 155 to a linearly polarized (for instance, s-polarized) beam perpendicular to the emitted light beam. Then, after passing through the collimator lens 152, the returning beam is made incident on the hologram unit 250. The returning beam incident on the hologram unit 250 passes through the second polarization hologram $150h_2$ and is diffracted by the first polarization hologram $150h_1$ to be received by the light receiver 159. Each of the light-receiving elements forming the light receiver 159 outputs a current signal corresponding to its received amount of light to the reproduction signal processing circuit 128.

Generally, in the case of using a polarization hologram, the amount of light received by the light receiver 159 is affected by the phase difference between the ordinary and extraordinary ray components of a light beam due to the optical anisotropy of the recording surface of the optical disk 115. If the returning beam incident on the polarization hologram includes such a phase difference, the direction of polarization of the returning beam is not uniquely determined, thus reducing the amount of light received by the light receiver 159. Particularly, if the phase difference varies depending on a position on the recording surface, that is, if there is a variation in the phase difference, the amount of light received by the light receiver 159 varies depending on the variation in the phase difference. Accordingly, the S/N ratio of the output signal of the light receiver 159 is decreased so that wrong servo control may be performed in some cases. Therefore, a non-polarization hologram may be used for an information recording medium causing a great variation in the phase difference, and a polarization hologram may be used for an information recording medium causing little variation in the phase difference. Currently, DVDs having phase differences exceeding a standard value are extremely small in number. Therefore, only the first hologram 150c may be replaced by a polarization hologram.

Figure 22:
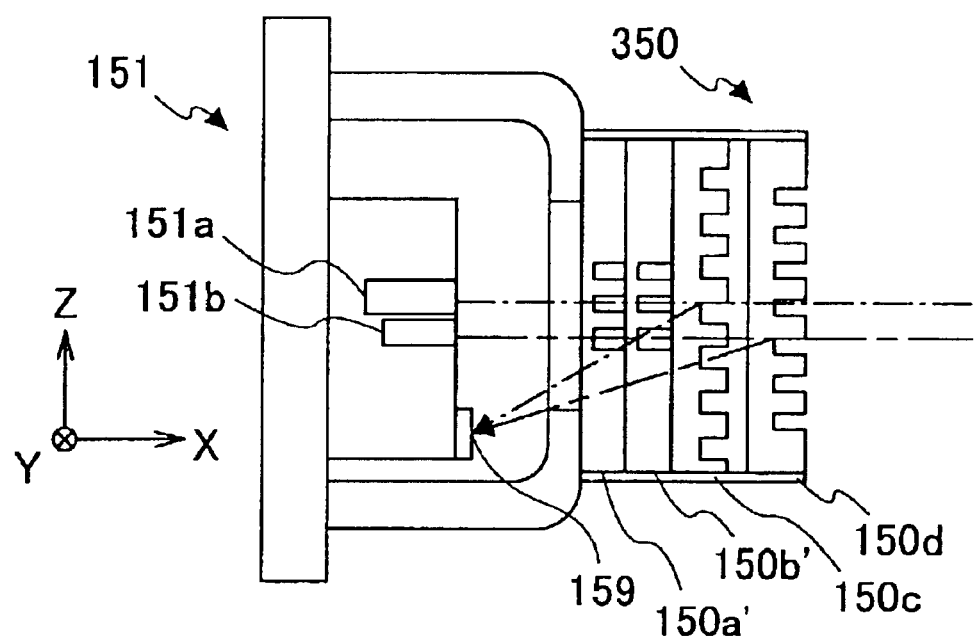
FIG. 22 is a diagram for illustrating the light-emitting and light-receiving module and another hologram unit employing polarization grating elements according to the sixth embodiment of the present invention.

Further, in this embodiment, each of the grating elements 150a and 150b forming the hologram unit 150 is a non-polarization grating element. However, the hologram unit 150 may be replaced by a hologram unit 350 that replaces the first and second grating elements 150a and 150b of the hologram unit 150 with first and second polarization grating elements 150a' and 150b' as shown in FIG. 22. In this case, as in the above-described case of using the polarization holograms the λ/4 plate 155 is provided between the collimator lens 152 and the objective lens 160 in the optical pickup unit 123 in order to provide a difference of 90° between the direction of polarization of the light beam emitted from each of the first and second semiconductor lasers 151a and 151b and the direction of polarization of the returning beam. Then, by setting each of the first and second polarization grating elements 150a' and 150b' so that the diffraction efficiency is low for the direction of polarization of the light beam emitted from the light-emitting and light-receiving module 151 and is high for the direction of polarization of the returning beam, the diffraction of the returning beam passing through the first and second holograms 150c and 150d by each of the first and second polarization grating elements 150a' and 150b' can be controlled even when the returning beam is made incident on each of the first and second polarization grating elements 150a' and 150b'. Therefore, the distance between the first and second polarization grating elements 150a' and 150b' and the first and second holograms 150c and 150d can be shortened, that is, the hologram unit 350 can be smaller in size. In the case of using the optical pickup unit 123 for recording, for instance, normally, a collimator lens having a short focal length (of approximately 10 mm, for instance) is employed in order to increase the amount of light obtained from a light beam emitted from each of the light sources. If the collimator lens 152 has a short focal distance, the distance between the light sources and the collimator lens 152 (working distance) becomes short. By downsizing the hologram unit, however, the optical pickup unit 123 can be assembled and adjusted with more ease at lower cost and be smaller in size. It is also possible that only one of the first and second grating elements 150a and 150b is replaced by a polarization grating element.

Further, in this embodiment, at least one of the grating elements and the holograms of the optical pickup unit 123 may have both wavelength selectivity and the polarization characteristic.

Figure 23:
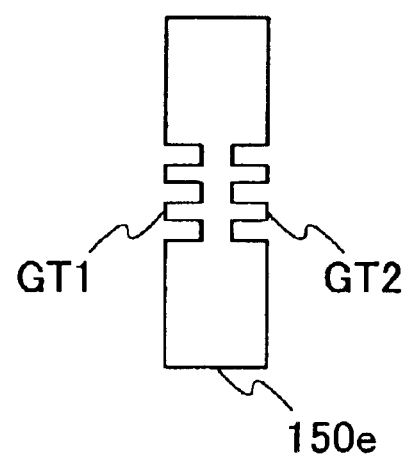
FIG. 23 is a diagram for illustrating a grating element formed by forming different diffraction gratings on opposing sides of a substrate according to the sixth embodiment of the present invention.

In this embodiment, the first and second grating elements 150a and 150b are provided individually. However, as shown in FIG. 23, the first and second grating elements 150a and 150b may be realized by forming a diffraction grating GT1 having the same diffraction effect as the first grating element 150a on one side of a transparent substrate 150e and a diffraction grating GT2 having the same diffraction effect as the second grating element 150b on the other side of the transparent substrate 150e. Thereby, grating elements can be incorporated into the hologram unit 150 with more ease and positioned relative to each other with high accuracy. Further, the number of times the grating elements are adjusted can be reduced from two to one. Consequently, the optical pickup unit 123 can be assembled and adjusted at lower cost. Further, the area occupied by the grating elements can be reduced, so that the optical pickup unit 123 can be smaller in size.

Figure 24:
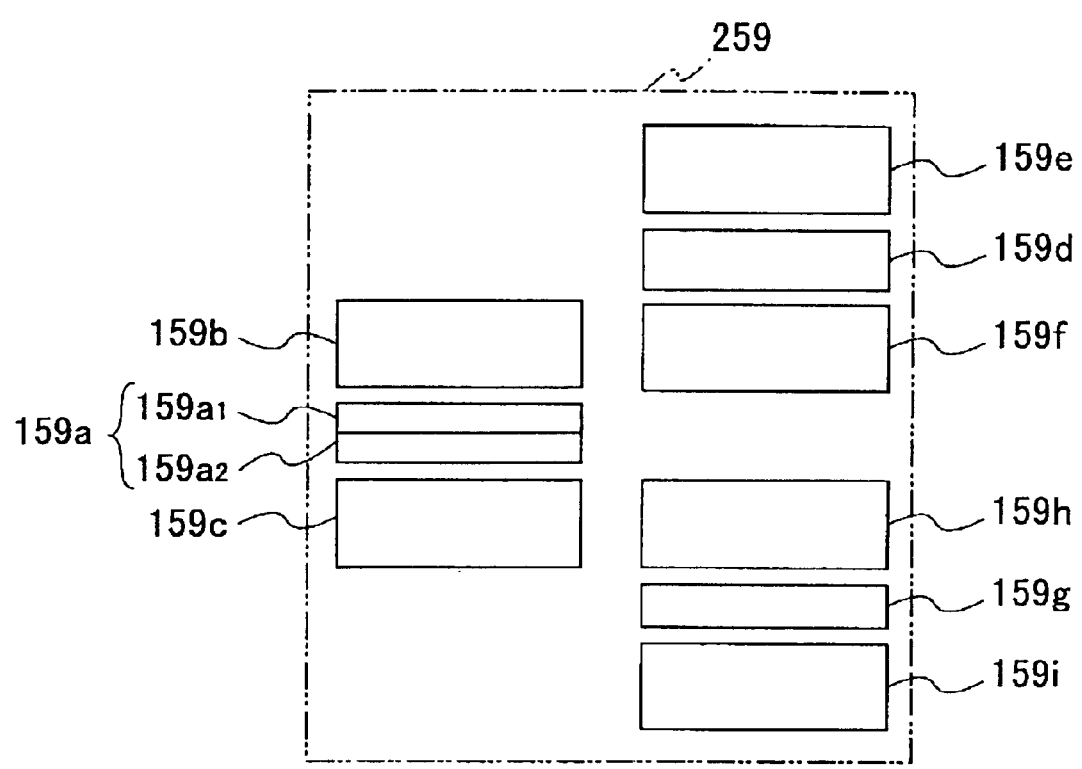
FIG. 24 is a diagram for another light receiver in which some of light-receiving elements are used in common for receiving both 650 nm and 780 nm light beams according to the sixth embodiment of the present invention.

Further, in the above-described embodiment, the light receiver 159 has the light-receiving elements that are divided into the groups corresponding to the diffracted lights from each of the first and second holograms 150c and 150d. However, the light receiver 159 may be replaced by a light receiver 259 in which the same light-receiving elements are used for receiving the ±1$^{st}$-order diffracted lights included in the 650 nm returning beam and the ±1$^{st}$-order diffracted lights included in the 780 nm returning beam as shown in FIG. 24. In the light receiver 259, the two light-receiving elements 159$b_1$ and 159$b_2$ of the light receiver 159 are replaced by a single light-receiving element 159$b$, the two light-receiving elements 159$c_1$ and 159$c_2$ of the light receiver 159 are replaced by a single light-receiving element 159$c$, the two light-receiving elements 159$e_1$ and 159$e_2$ of the light receiver 159 are replaced by a single light-receiving element 159$e$, the two light-receiving elements 159$f_1$ and 159$f_2$ of the light receiver 159 are replaced by a single light-receiving element 159$f$, the two light-receiving elements 159$h_1$ and 159$h_2$ of the light receiver 159 are replaced by a single light-receiving element 159$h$, and the two light-receiving elements 159$i_1$ and 159$i_2$ of the light receiver 159 are replaced by a single light-receiving element 159$i$. Thereby, the number of light-receiving elements and the number of signal terminals can be reduced so that the light receiver 259 can be smaller in size. As a result, the light-emitting and light-receiving module 151 can also be smaller in size.

In this configuration, in the case of detecting the tracking error signal Te, the track cross signal TC, and the reproduction signal RF, a signal supplied from the light-receiving element 159$b$ replaces each of the signals $Sb_1$ and $Sb_2$, a signal supplied from the light-receiving element 159$c$ replaces each of the signals $Sc_1$ and $Sc_2$, a signal supplied from the light-receiving element 159$e$ replaces each of the signals $Se_1$ and $Se_2$, a signal supplied from the light-receiving element 159$f$ replaces each of the signals $Sf_1$ and $Sf_2$, a signal supplied from the light-receiving element 159$h$ replaces each of the signals $Sh_1$ and $Sh_2$, and a signal supplied from the light-receiving element 159$i$ replaces each of the signals $Si_1$ and $Si_2$ in the above-described equations (1), (2), (7), (10), (11), and (16). Only some of the light-receiving elements may be integrated to be used in common for receiving the 650 and 780 nm returning beams.

Figure 25A:
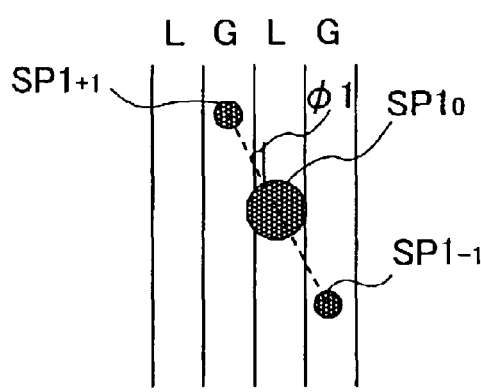
FIGS. 25A through 25D are diagrams for illustrating positions at which the 650 nm and 780 nm light beams are received on the light receiver when a straight line connecting the centers of a $+1^{st}$-order beam spot and a $-1^{st}$-order beam spot formed on the recording surface of the DVD disk and a straight line connecting the centers of a $+1^{st}$-order beam spot and a $-1^{st}$-order beam spot formed on the recording surface of the CD disk extend in the same direction according to the sixth embodiment of the present invention.
Figure 25B:
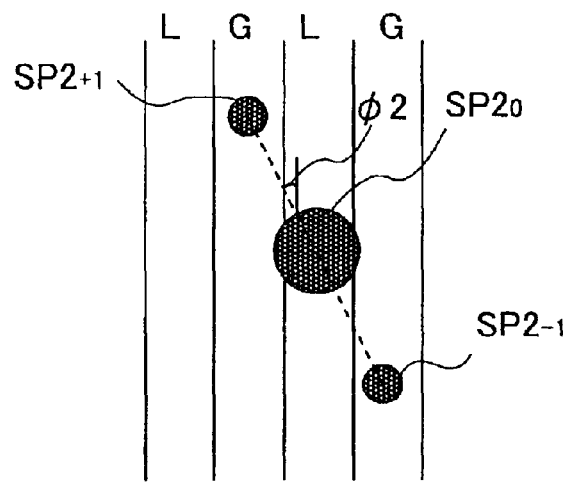
Figure 25C:
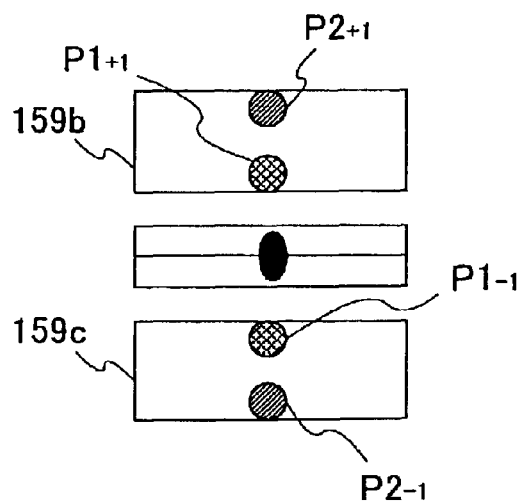
Figure 25D:
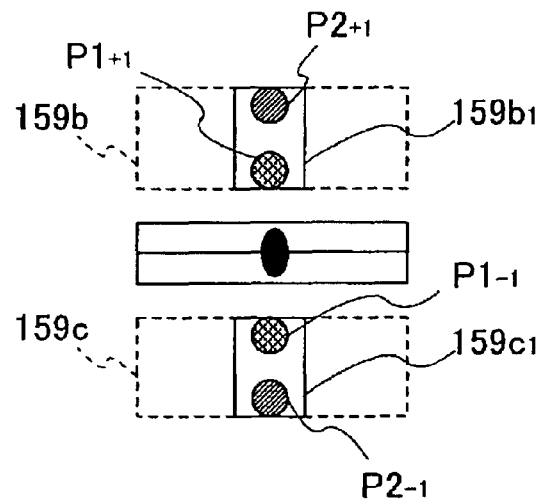

Here, as shown in FIG. 25A, the angle formed by the tangential directions of the tracks and the straight line connecting the center of the +1$^{st}$-order beam spot $SP1_{+1}$ and the center of the −1$^{st}$-order beam spot $SP1_{-1}$ formed on the recording surface of the DVD optical disk 115 is defined as φ1, and as shown in FIG. 25B, the angle formed by the tangential directions of the tracks and the straight line connecting the center of the +1$^{st}$-order beam spot $SP2_{+1}$ and the center of the −1$^{st}$-order beam spot $SP2_{-1}$ formed on the recording surface of the CD optical disk 115 is defined as φ2. By adjusting the first and second holograms 150c and 150d so that the angles φ1 and φ2 are substantially equal, the +1$^{st}$-order diffracted light $P1_{+1}$ included in the 650 nm returning beam and the +1$^{st}$-order diffracted light $P2_{+1}$ included in the 780 nm returning beam can be received on the same line extending along a direction perpendicular to the length of the light-receiving element 159$b$ as shown in FIG. 25C, and the −1$^{st}$-order diffracted light $P1_{-1}$ included in the 650 nm returning beam and the −1$^{st}$-order diffracted light $P2_{-1}$ included in the 780 nm returning beam can be received on the same line extending along a direction perpendicular to the length of the light-receiving element 159$c$ as shown in FIG. 25C. Accordingly, the light-receiving element 159$b$ may be reduced in length as a light-receiving element 159$b_1$ as shown in FIG. 25D, and the light-receiving element 159$c$ may be reduced in length as a light-receiving element 159$c_1$ as shown in FIG. 25D. Thereby, the light-receiving areas of the light-receiving elements 159$b$ and 159$c$ can be reduced to those of the light-receiving elements 159$b_1$ and 159$c_1$, so that the light-emitting and light-receiving module 151 can be reduced in size. The same thing applies to the light-receiving elements 159$e$, 159$f$, 159$h$, and 159$i$ of the light receiver 259.

Figure 26A:
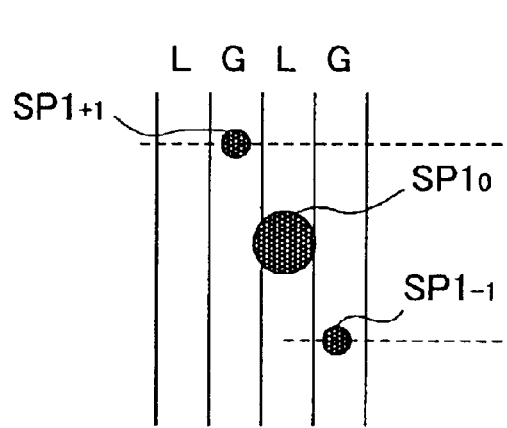
FIGS. 26A through 26D are diagrams for illustrating positions at which the 650 nm and 780 nm light beams are received on the light receiver when a straight line connecting the center of the $+1^{st}$-order beam spot formed on the recording surface of the DVD disk and the center of the $+1^{st}$-order beam spot formed on the recording surface of the CD disk and a straight line connecting the center of the $-1^{st}$-order beam spot formed on the recording surface of the DVD disk and the center of the $-1^{st}$-order beam spot formed on the recording surface of the CD disk extend substantially in tracking directions according to the sixth embodiment of the present invention.
Figure 26B:
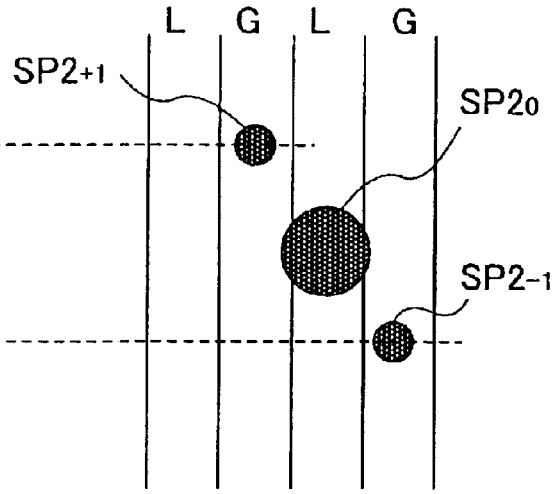
Figure 26C:
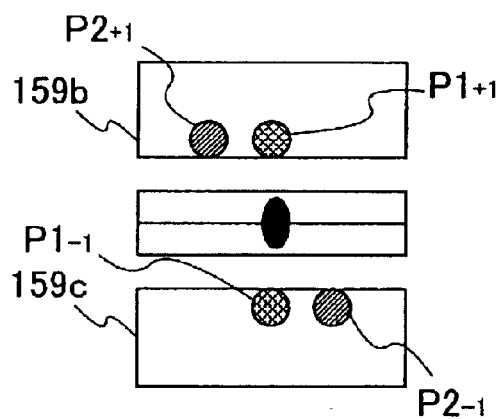
Figure 26D:
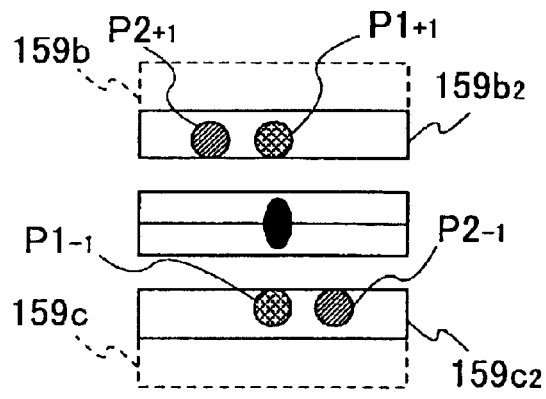

Further, in this embodiment, by adjusting the first and second holograms 150c and 150d so that the straight line connecting the center of the +1$^{st}$-order beam spot $SP1_{+1}$ formed on the recording surface of the DVD optical disk 115 and the center of the +1$^{st}$-order beam spot SP2$_{+1}$ formed on the recording surface of the CD optical disk 115 and the straight line connecting the center of the −1$^{st}$-order beam spot SP1$_{-1}$ formed on the recording surface of the DVD optical disk 115 and the center of the −1$^{st}$-order beam spot SP2$_{-1}$ formed on the recording surface of the CD optical disk 115 extend substantially in the tracking directions as shown in FIGS. 26A and 26B, the +1$^{st}$-order diffracted light P1$_{+1}$ included in the 650 nm returning beam and the +1$^{st}$-order diffracted light P2$_{+1}$ included in the 780 nm returning beam are received on the same line extending along the length of the light-receiving element 159b as shown in FIG. 26C. Further, the −1$^{st}$-order diffracted light P1$_{-1}$ included in the 650 nm returning beam and the −1$^{st}$-order diffracted light P2$_{-1}$ included in the 780 nm returning beam are received on the same line extending along the length of the light-receiving element 159c as shown in FIG. 26C. Accordingly, the light-receiving element 159b may be reduced in size in the direction perpendicular to the length thereof as a light-receiving element 159b$_2$ as shown in FIG. 26D, and the light-receiving element 159c may be reduced in size in the direction perpendicular to the length thereof as a light-receiving element 159c$_2$ as shown in FIG. 26D. Thereby, the light-receiving areas of the light-receiving elements 159b and 159c can be reduced to those of the light-receiving elements 159b$_2$ and 159c$_2$, so that the light-emitting and light-receiving module 151 can be reduced in size. The same thing applies to the light-receiving elements 159e, 159f, 159h, and 159i of the light receiver 259.

Figure 27A:
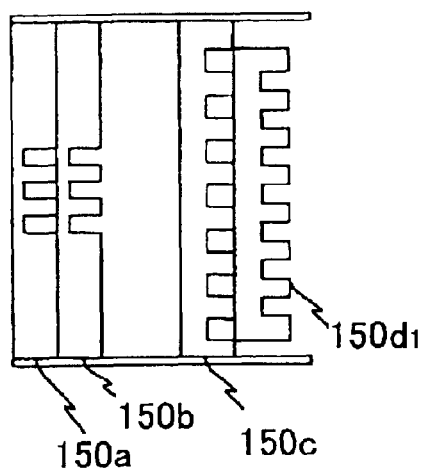
FIGS. 27A through 27C are diagrams showing variations of the hologram unit according to the sixth embodiment of the present invention.
Figure 27B:
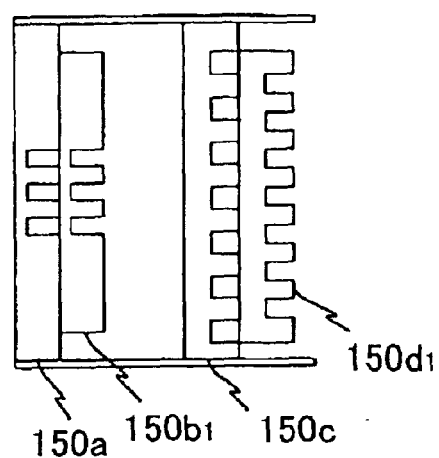
Figure 27C:
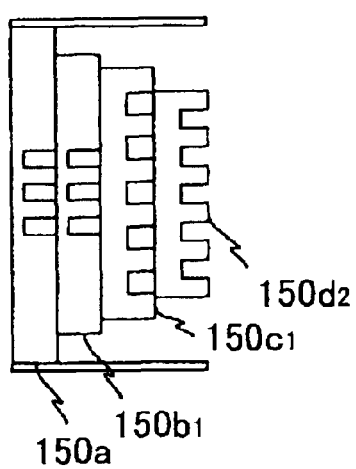

In this embodiment, the second hologram 150d may be replaced by a hologram 150d$_1$ that has the same hologram effect as the second hologram 150d and is reduced in area compared therewith as shown in FIG. 27A. Thus, by using the downsized hologram 150d$_1$ as the second hologram 150d that is attached after the first hologram 150c, the first and second grating elements 150a and 150b and the first hologram 150c that are already positioned are prevented from being displaced with more reliability when the hologram 150d$_1$ is attached thereto. Accordingly, the hologram unit 150' can be assembled and adjusted more efficiently at reduced cost. For the same purpose, the second grating element 150b may be replaced by a grating element 150b$_1$ that has the same diffraction effect as the second grating element 150b and is reduced in area compared therewith as shown in FIG. 27B. Further, when the first hologram 150c is superimposed on the grating element 150b$_1$, the first hologram 150c may be replaced by a hologram 150c$_1$ whose area is smaller than that of the grating element 150b$_1$, and the second hologram 150d or the hologram 150d$_1$ may be replaced by a hologram 150d$_2$ whose area is smaller than that of the hologram 150c$_1$ as shown in FIG. 27C.

Figure 28:
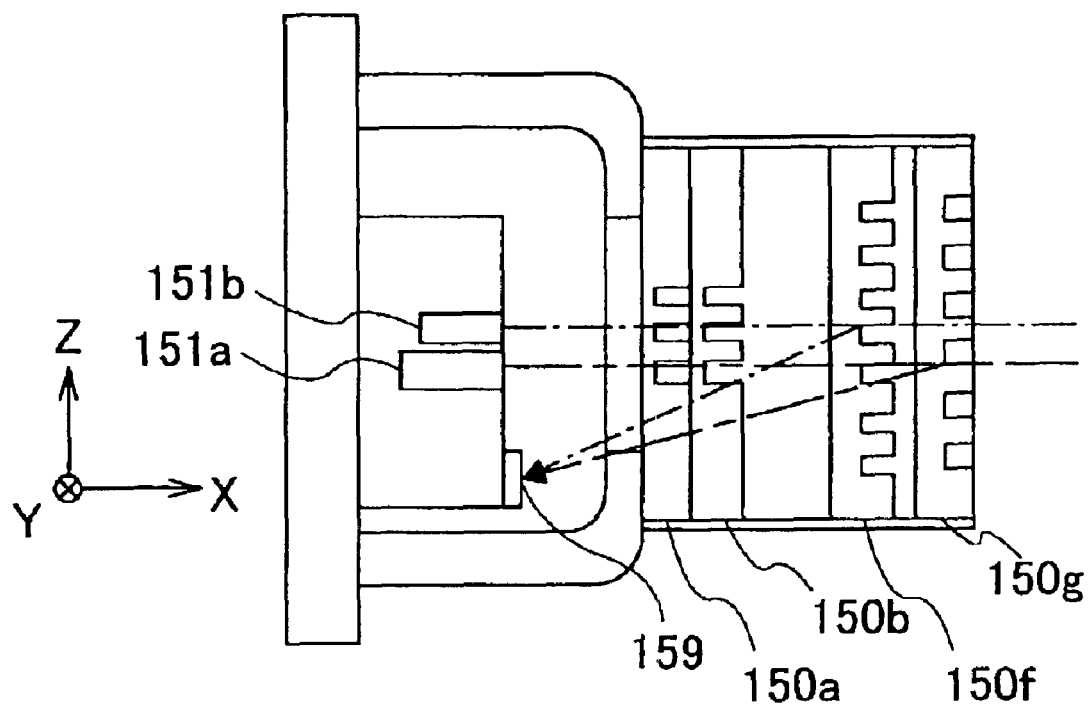
FIG. 28 is a diagram for illustrating the relationship between positions of semiconductor lasers and the light receiver in the light-emitting and light-receiving module according to the sixth embodiment of the present invention.

Further, in this embodiment, the second semiconductor laser 151b is provided closer to the light receiver 159 than the first semiconductor laser 151a is. However, the first semiconductor laser 151a may be provided closer to the light receiver 159 as shown in FIG. 28. Generally, in a diffractive optical element such as a hologram, the angle of diffraction becomes greater as the wavelength of an incident light beam becomes longer with the groove pitch remaining constant, while the angle of diffraction becomes greater as the groove pitch becomes smaller with the wavelength of the incident light beam remaining constant. In other words, the groove pitch should be smaller as the wavelength of the incident light beam becomes shorter in order to keep the angle of diffraction constant. Therefore, in this case, by providing a hologram 150f optimized for the 780 nm light beam closer to the light receiver 159 than a hologram 150g optimized for the 650 nm light beam is, the hologram 150g may have a groove pitch larger than that of the first hologram 150c. Thereby, a hologram for the 650 nm light beam can be designed and manufactured with more ease, so that the optical pickup unit 123 can be reduced in cost.

In this embodiment, the light-emitting and light-receiving module 151 and the hologram unit 150 are integrated with each other. However, the present invention is not limited to this configuration, and the light-emitting and light-receiving module 151 and the hologram unit 150 may be provided separately from each other.

In this embodiment, the first grating element 150a is provided closer to the light sources than the second grating element 150b is. However, the second grating element 150b may be provided closer to the light sources.

In this embodiment, the first and second grating elements 150a and 150b and the first and second holograms 150c and 150d are integrated into the hologram unit 150. However, the first and second grating elements 150a and 150b may be provided separately from the first and second holograms 150c and 150d. Further, the first and second grating elements 150a and 150b are integrated with each other in this embodiment, but the first and second grating elements 150a and 150b may be provided separately from each other. Further, the first and second holograms 150c and 150d are integrated with each other in this embodiment, but the first and second holograms 150c and 150d may be provided separately from each other.

In this embodiment, the first and second semiconductor lasers 151a and 151b and the light receiver 159 are provided in the same housing, but the first and second semiconductor lasers 151a and 151b may be provided separately from the light receiver 159.

In this embodiment, the 650 and 780 nm light beams are emitted from the light sources. However, the wavelengths of the light beams are not limited to these values according to the present invention.

In this embodiment, the two semiconductor lasers 151a and 151b are employed as light sources. However, the number of light sources is not limited to two according to the present invention.

In this embodiment, the two semiconductor lasers 151a and 151b are provided separately.

Therefore, a high-power light source (of approximately 100 mW, for instance) can be used for each of the semiconductor lasers 151a and 151b, so that the optical pickup unit 123 can be used for high-speed recording.

Thus, according to the present invention, tracking error information can be obtained with accuracy with respect to information recording medium of a plurality of types with the optical pickup unit reduced in size and cost.

Further, according to the optical disk unit of the present invention, information recording can be performed on information recording medium of a plurality of types with accuracy and stability.

The present invention is not limited to the specifically disclosed embodiments, but variations and modifications may be made without departing from the scope of the present invention.

The present application is based on Japanese priority applications No. 2001-300051 filed on Sep. 28, 2001 and No. 2002-070186 filed on Mar. 14, 2002, the entire contents of which are hereby incorporated by reference.

What is claimed is:

1. An optical pickup unit for performing at least one of information recording, reproduction, and erasure, the optical pickup unit comprising:

a light source of a plurality of semiconductor laser chips of different light-emission wavelengths;

a plurality of holograms provided to respective substrates, the holograms being placed between said light source and an optical recording medium, the holograms including at least one non-polarization hologram having a substantially uniform diffraction efficiency irrespective of a direction of polarization of incident light and at least one polarization hologram having a diffraction efficiency varying depending on a direction of polarization of incident light; and a wave plate provided closer to the optical recording medium than the polarization hologram is, wherein:

a light beam emitted from a selected one of the semiconductor laser chips passes through said holograms to be focused onto a recording surface of the optical recording medium and reflected therefrom as a returning beam;

the returning beam is diffracted by a corresponding one of said holograms so that a diffracted light of the returning beam is received by a light-receiving element; and said wave plate turns a direction of polarization of the returning beam to a different direction from that of the light beam emitted from the selected one of the semiconductor laser chips.

2. The optical pickup unit as claimed in claim 1, wherein the light beam emitted from the selected one of the semiconductor laser chips has a wavelength corresponding to a type of the optical recording medium; and the one of the holograms diffracts the returning beam corresponding to the wavelength of the emitted light beam.

3. The optical pickup unit as claimed in claim 1, wherein all of the diffracted lights of the different wavelengths generated by the holograms corresponding to the wavelengths are received by the light-receiving element.

4. The optical pickup unit as claimed in claim 1, wherein the substrates of the holograms are integrated with one another.

5. The optical pickup unit as claimed in claim 4, wherein the substrates of the holograms are integrated so that any adjacent two of the substrates have a gap formed therebetween.

6. The optical pickup unit as claimed in claim 1, wherein a refractive index of the polarization hologram varies periodically in a direction of a grating arrangement with respect to one of polarized lights in two directions crossing at right angles on a surface of the substrate and is generally uniform with respect to the other one of the polarized lights.

7. The optical pickup unit as claimed in claim 1, wherein the polarization hologram is formed as a surface structure of an obliquely deposited film of an inorganic material.

8. The optical pickup unit as claimed in claim 1, wherein the polarization hologram is formed of a stretched organic film.

9. The optical pickup unit as claimed in claim 1, wherein the non-polarization hologram is formed by forming a grating of grooves on a transparent substrate.

10. The optical pickup unit as claimed in claim 1, wherein the non-polarization hologram transmits substantially all of a light beam of a specified one of a plurality of wavelengths and generates a first-order diffracted light with respect to each of light beams of the other wavelengths.

11. The optical pickup unit as claimed in claim 10, wherein the non-polarization hologram transmits substantially all of a light beam of a 660 nm wavelength for DVDs and generates the first-order diffracted light with respect to a light beam of a 780 nm wavelength for CDs.

12. The optical pickup unit as claimed in claim 1, wherein the polarization hologram is characterized so as to transmit substantially all of an incident light beam of a specific direction of polarization and diffract substantially all of a returning beam of the incident light beam, the returning beam having a direction of polarization perpendicular to the specific direction of polarization, the polarization hologram being oriented so as to transmit substantially all of a light beam emitted from any of the semiconductor laser chips of said light source to be incident on the polarization hologram.

13. The optical pickup unit as claimed in claim 1, wherein the polarization hologram is provided on a side of said light source and the non-polarization hologram is provided on a side of the optical recording medium in an optical path from said light source to the optical recording medium.

14. The optical pickup unit as claimed in claim 1, wherein said wave plate is integrated with one of the substrates of the holograms.

15. The optical pickup unit, as claimed in claim 1, wherein said wave plate provides a phase difference in a predetermined range centered on 90° to a wavelength of the returning beam to be diffracted to be detected.

16. The optical pickup unit as claimed in claim 15, wherein the phase difference falls within a range of 90°±19°.

17. An optical disk drive unit for performing at least one of information recording, reproduction, and erasure with respect to an optical recording medium selected from disk-like optical recording media of a plurality of types using different wavelengths, the optical disk drive unit comprising:

an optical pickup unit, the optical pickup unit comprising:

a light source of a plurality of semiconductor laser chips of different light-emission wavelengths;

a plurality of holograms provided to respective substrates, the holograms being placed between said light source and the optical recording medium, the holograms including at least one non-polarization hologram having a substantially uniform diffraction efficiency irrespective of a direction of polarization of incident light and at least one polarization hologram having a diffraction efficiency varying depending on a direction of polarization of incident light; and a wave plate provided closer to the optical recording medium than the polarization hologram is, wherein:

a light beam emitted from a selected one of the semiconductor laser chips passes through said holograms to be focused onto a recording surface of the optical recording medium and reflected therefrom as a returning beam;

the returning beam is diffracted by a corresponding one of said holograms so that a diffracted light of the returning beam is received by a light-receiving element; and said wave plate turns a direction of polarization of the returning beam to a different direction from that of the light beam emitted from the selected one of the semiconductor laser chips.

18. The optical disk drive unit as claimed in claim 17, wherein the light beam emitted from the selected one of the semiconductor laser chips has a wavelength corresponding to a type of the optical recording medium; and the one of the holograms diffracts the returning beam corresponding to the wavelength of the emitted light beam.

19. The optical disk drive unit as claimed in claim 17, wherein all of the diffracted lights of the different wavelengths generated by the holograms corresponding to the wavelengths are received by the light-receiving element.

20. The optical disk drive unit as claimed in claim 17, wherein the substrates of the holograms are integrated with one another.

21. The optical disk drive unit as claimed in claim 20, wherein the substrates of the holograms are integrated so that any adjacent two of the substrates have a gap formed therebetween.

22. The optical disk drive unit as claimed in claim 17, wherein a refractive index of the polarization hologram varies periodically in a direction of a grating arrangement with respect to one of polarized lights in two directions crossing at right angles on a surface of the substrate and is generally uniform with respect to the other one of the polarized lights.

23. The optical disk drive unit as claimed in claim 17, wherein the polarization hologram is formed as a surface structure of an obliquely deposited film of an inorganic material.

24. The optical disk drive unit as claimed in claim 17, wherein the polarization hologram is formed of a stretched organic film.

25. The optical disk drive unit as claimed in claim 17, wherein the non-polarization hologram is formed by forming a grating of grooves on a transparent substrate.

26. The optical disk drive unit as claimed in claim 17, wherein the non-polarization hologram transmits substantially all of a light beam of a specified one of a plurality of wavelengths and generates a first-order diffracted light with respect to each of light beams of the other wavelengths.

27. The optical disk drive unit as claimed in claim 26, wherein the non-polarization hologram transmits substantially all of a light beam of a 660 nm wavelength for DVDs and generates the first-order diffracted light with respect to a light beam of a 780 nm wavelength for CDs.

28. The optical disk drive unit as claimed in claim 17, wherein the polarization hologram is characterized so as to transmit substantially all of an incident light beam of a specific direction of polarization and diffract substantially all of a returning beam of the incident light beam, the returning beam having a direction of polarization perpendicular to the specific direction of polarization, the polarization hologram being oriented so as to transmit substantially all of a light beam emitted from any of the semiconductor laser chips of said light source to be incident on the polarization hologram.

29. The optical disk drive unit as claimed in claim 17, wherein the polarization hologram is provided on a side of said light source and the non-polarization hologram is provided on a side of the optical recording medium in an optical path from said light source to the optical recording medium.

30. The optical disk drive unit as claimed in claim 17, wherein said wave plate is integrated with one of the substrates of the holograms.

31. The optical disk drive unit as claimed in claim 17, wherein said wave plate provides a phase difference in a predetermined range centered on 90° to a wavelength of the returning beam to be diffracted to be detected.

32. The optical disk drive unit as claimed in claim 31, wherein the phase difference falls within a range of 90°±19°.

* * * * *